United States Patent
Kim

(10) Patent No.: US 10,268,247 B2
(45) Date of Patent: Apr. 23, 2019

(54) THERMAL MANAGEMENT OF SPATIALLY DISPERSED OPERATION PROCESSORS

(71) Applicant: Samsung Electronics Co., Ltd., Suwon-si (KR)

(72) Inventor: Eunki Kim, Uijeongbu-si (KR)

(73) Assignee: Samsung Electronics Co., Ltd. (KR)

( * ) Notice: Subject to any disclaimer, the term of this patent is extended or adjusted under 35 U.S.C. 154(b) by 140 days.

(21) Appl. No.: 15/372,738

(22) Filed: Dec. 8, 2016

(65) Prior Publication Data
US 2017/0168532 A1 Jun. 15, 2017

(30) Foreign Application Priority Data
Dec. 11, 2015 (KR) .......................... 10-2015-0177310

(51) Int. Cl.
| G06F 1/32 | (2006.01) |
| G06F 1/20 | (2006.01) |
| G06F 1/3206 | (2019.01) |

(52) U.S. Cl.
CPC ............ G06F 1/206 (2013.01); G06F 1/3206 (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| 6,029,119 A | 2/2000 | Atkinson |
| 6,523,112 B1 | 2/2003 | Gallagher et al. |
| 6,535,798 B1 | 3/2003 | Bhatia et al. |
| 6,535,944 B1 | 3/2003 | Johari et al. |
| 6,701,272 B2 | 3/2004 | Cooper et al. |
| 7,043,405 B2 | 5/2006 | Orenstien et al. |
| 7,360,102 B2 | 4/2008 | Inoue |
| 7,400,945 B2 | 7/2008 | Radhakrishnan et al. |
| 7,412,353 B2 | 8/2008 | Borkar et al. |
| 7,596,430 B2 | 9/2009 | Aguilar, Jr. et al. |
| 7,937,188 B2 | 5/2011 | Liu et al. |
| 2002/0087614 A1 | 7/2002 | Kocev et al. |
| 2008/0005603 A1* | 1/2008 | Buch ...................... G06F 1/206 713/320 |
| 2009/0094472 A1 | 4/2009 | Lin |
| 2014/0089700 A1 | 3/2014 | Chang et al. |
| 2015/0121105 A1* | 4/2015 | Ahn ........................ G06F 1/324 713/322 |
| 2015/0134995 A1* | 5/2015 | Park .................... G06F 11/3058 713/340 |
| 2016/0124476 A1* | 5/2016 | Mittal ................... G06F 1/3206 713/320 |
| 2016/0147291 A1* | 5/2016 | Thomas ................ G06F 1/3296 713/320 |

* cited by examiner

*Primary Examiner* — Zahid Choudhury
(74) *Attorney, Agent, or Firm* — Onello & Mello, LLP

(57) ABSTRACT

An operation processor device includes a plurality of operation processing cores and at least one temperature sensor. The temperature sensor senses temperatures of the operation processing cores. When a temperature of a first operation processing core that is operating is sensed to be equal to or higher than a reference value, a second operation processing core that does not operate starts to operate and the first operation processing core stops operating.

19 Claims, 13 Drawing Sheets

| Temperature | Operation |
|---|---|
| Core temp. ≥Th1 | Throttling |
| Core temp. ≥Th2 | Core being powered off |
| Device temp. ≥Th3 | Device being powered off |

THERMAL MANAGEMENT OF SPATIALLY DISPERSED OPERATION PROCESSORS

CROSS-REFERENCE TO RELATED APPLICATIONS

This U.S. non-provisional patent application claims priority under 35 U.S.C. § 119 to Korean Patent Application No. 10-2015-0177310, filed on Dec. 11, 2015, in the Korean Intellectual Property Office, the entire contents of which are incorporated herein by reference.

FIELD OF THE INVENTION

The present disclosure relates to thermal management of processors, and more specifically to controlling the operation of processors in accordance with their operating temperature and spatial location with respect to one another.

BACKGROUND

Electronic devices may include various electric and electronic circuits to perform one or more functions for the device for to provide a service to a user of the device. An electronic device controls the operation of one or more circuits, according to the operations of an operation processor, (or a controller including the operation processor) included in the electronic device. The operation processor processes various arithmetic or logical operations required to perform a specific function in the electronic device. An operation result of the operation processor is used to control the operations of other circuits.

Electronic devices are required to perform an increasing number of functions with improved performance to provide various services within the device and to users. Accordingly, electronic devices are being implemented with a plurality of operation processing cores (e.g. a "multi-core processor"). The operating performance of the operation processor is maximized when all of the operation processing cores in the operation processor are operating. However, concurrent operation of all of the operation processing cores increases the temperature of the electronic device. As the temperature of the electronic device increases, the device consumes more power and the operating life is also reduced. Conversely, when only a few of operation processing cores operate, the performance of the operation processor is degraded.

Accordingly, it is desirable to efficiently and effectively manage operations of operation processing cores, with consideration for operation performance, power consumption, or operating life of an electronic device and an operation processor.

SUMMARY

The example embodiments of the present disclosure may provide a scheme(s) for managing operations of an operation processor that includes a plurality of operation processing cores. The example embodiments may manage operations of the operation processing cores depending on temperature and/or a spatial position of each operation processing core, to efficiently and effectively operate the operation processor with consideration for operation performance, power consumption, and/or life.

In some example embodiments, an operation processor device may include a plurality of operation processing cores and at least one temperature sensor. The operation processing cores may be disposed at spatially different positions. The temperature sensor may sense temperatures of the operation processing cores. When a temperature of a first operation processing core that is operating is sensed to be equal to or higher than a reference value, a second operation processing core that does not operate may start to operate and the first operation processing core may stop operating.

In some example embodiments, an electronic device may include an operation processor and a power manager. The operation processor may include a plurality of operation processing cores. The power manager may supply power to the plurality of operation processing cores of the operation processor. When a temperature of a first operation processing core increases to a value that is equal to or greater than a reference value while power is supplied to the first operation processing core and a second operation processing core, power supply to a third operation processing core that is not supplied with power may be started and power supply to the first operation processing core may be stopped.

As will be appreciated, embodiments as disclosed include at least the following. In one embodiment, an operation processor comprises a plurality of operation processing cores disposed at spatially different positions. At least one temperature sensor is configured to sense temperatures of the plurality of operation processing cores, wherein when a temperature of a first operation processing core that is operating is sensed to be equal to or greater than a reference value, a second operation processing core that does not operate starts to operate and the first operation processing core stops operating.

In another embodiment, an electronic device comprises an operation processor comprising a plurality of operation processing cores. A power manager is configured to supply power to the plurality of operation processing cores of the operation processor, wherein when a temperature of a first operation processing core increases to a value that is equal to or greater than a reference value while power is supplied to the first operation processing core and a second operation processing core, power supplied to a third operation processing core that is not supplied with power is started and power supplied to the first operation processing core is stopped.

In another embodiment, an operation processor comprises a plurality of processor cores. Each processor core is spatially dispersed from another processor core. At least one of the processor cores is configured to execute at least one task. The operation processor further comprises a plurality of thermal sensors. Each thermal sensor is proximally located to a respective processor core and is configured to sense a temperature of the respective processor core. A system control device is in communication with each of the thermal sensors and is configured to migrate at least one task from a first processor core to a second processor core in response to a temperature of the first processor core exceeding a first threshold, reduce an operating frequency of the first processor core in response to the temperature of the first processor core exceeding a second threshold, deactivate the first processor core and activate the second processor core in response to the temperature of the first processor core exceeding a third threshold, and deactivate the operation processor in response to the temperature of the first processor core exceeding a fourth threshold.

BRIEF DESCRIPTION OF THE DRAWINGS

The forgoing and other objects, features, and advantages of the present disclosure will be described below in more detail with reference to the accompanying drawings of non-limiting embodiments in which like reference characters may refer to like parts throughout the different drawings. The drawings are not necessarily to scale, emphasis instead being placed upon illustrating principles of the present disclosure. In the drawings.

DETAILED DESCRIPTION

The above-mentioned features and the following description are provided to facilitate understanding of the present disclosure. Accordingly, the present disclosure should not be construed as limited to the "example" embodiments set forth herein, and may be embodied in different forms. The following embodiments are merely examples for fully disclosing the present invention, and are described to provide the inventive concepts to those skilled in the art. Therefore, if there are many ways to implement the components of the present disclosure, it is obvious that the present disclosure is implemented with any one of the ways or any one of the similar things thereof.

If it is mentioned that any configuration includes or comprises specific component(s) or any process includes or comprises specific operation(s) in the present disclosure, this means that other component(s) or other operation(s) may be further included. That is, the terms used herein are only intended to describe the specific example embodiments, and is not intended to limit the scope of the present disclosure. Further, the examples described to help better understanding of the present disclosure include their complementary embodiments.

The terms used herein have the meanings in which those skilled in the art would generally understand. The terms commonly used are to be construed as the consistent meanings in the context of the present disclosure. In addition, the terms used herein should not be interpreted as an overly ideal or formal sense unless explicitly so defined herein. Hereinafter, example embodiments of the present disclosure will be described below with reference to the attached drawings.

Figure 1:
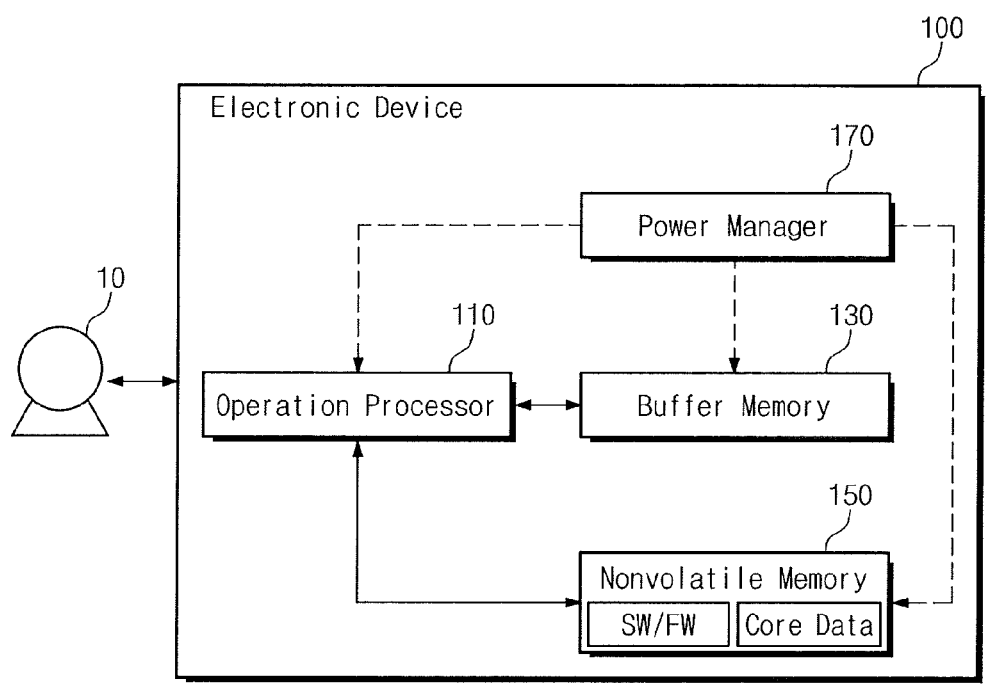
FIG. 1 is a block diagram illustrating communication between a user and an embodiment of an electronic device having an operation processor.

FIG. 1 is a block diagram illustrating communication between a user 10 and an embodiment of an electronic device 100 having an operation processor 110 according to some example embodiments. In various embodiments, the electronic device 100 includes an operation processor 110, a buffer memory 130, a nonvolatile memory 150, and a power manager 170. Non-limiting examples of the electronic device 100 include a desktop computer, a laptop computer, a tablet computer, a mobile communication device, and a smart phone.

The electronic device 100 may perform its own function(s) according to operations of various components included in the electronic device 100, and may provide a service to the user 10. For example, the electronic device 100 may process a command provided from the user 10 through a user interface (not shown). The electronic device 100 may perform various operations to process the user command. To achieve this, the electronic device 100 may include the operation processor 110.

The operation processor 110 may control and manage the overall operations of the electronic device 100. The operation processor 110 may include a plurality of operation processing cores, (see FIG. 2). For example, the operation processor 110 may be one of a general-purpose processor (e.g., a central processing unit (CPU), or a graphic processing unit (GPU)), a special-purpose processor (e.g., a workstation processor) and an application processor (AP).

Each of the operation processing cores of the operation processor 110 may perform various arithmetic operations or logical operations or both arithmetic and logical operations to operate the electronic device 100. For example, each of the operation processing cores may include a special-purpose processor circuit (e.g., a complex programmable logic device (CPLD), a field programmable gate array (FPGA), or application-specific integrated circuits (ASICs)) to perform any operation(s). The electronic device 100 may provide an output to the user 10 through the user interface, based on a result of the operation(s).

The buffer memory 130 may store data. The buffer memory 130 may include, for example, a volatile memory (e.g., a dynamic random access memory (DRAM), a static RAM (SRAM), or a synchronous DRAM (SDRAM)) or a nonvolatile memory (e.g., a flash memory, a phase-change RAM (PRAM), a magneto-resistive RAM (MRAM), a resistive RAM (ReRAM), or a ferroelectric RAM (FRAM)), or a combination of volatile and nonvolatile memories.

For example, the buffer memory 130 may store data processed by the operation processor 110 or data to be processed by the operation processor 110. In some cases, the buffer memory 130 may operate as a cache memory or a working memory of the operation processor 110. The buffer memory 130 may exchange data with the operation processor 110. The operation processor 110 may process various operations based on the data exchanged with the buffer memory 130.

The nonvolatile memory 150 may store data irrespective of whether power is supplied. For example, the nonvolatile memory 150 may include at least one nonvolatile memory (e.g., a read-only memory (ROM), a flash memory, a PRAM, an MRAM, a ReRAM, or an FRAM). The nonvolatile memory 150 may store various data used to operate the electronic device 100. For example, the nonvolatile memory 150 may store one or more of software data, and firmware data including an instruction code(s). The operation processor 110 may perform various operations and may operate the electronic device 100, based on the instruction code(s) of one or more of the software data and the firmware data. For example, the software data, the firmware data, or both, may include an operating system (OS) that controls the overall operations of the electronic device 100.

For example, the nonvolatile memory 150 may store data associated with the operation processing cores of the operation processor 110, (hereinafter referred to as "core data"). In some example embodiments, the operation processing cores included in the operation processor 110 may be disposed at spatially different positions (see FIG. 2). The core data may include data associated with positions of the operation processing cores. The operation processor 110 may refer to the core data to identify positions of the respective operation processing cores.

The power manager 170 may manage supplying power used to operate the electronic device 100. For example, the power manager 170 may receive power from a battery (not shown) included in the electronic device 100 or an external power source (not shown) provided separately from the electronic device 100. The power manager 170 may convert the received power into power used to operate components of the electronic device 100. To achieve this, the power manager 170 may include power-related circuits, such as a rectifier, or a regulator.

For example, the power manager 170 may supply power to the operation processing cores included in the operation processor 110. The operation processing cores of the operation processor 110 may process various operations by means of the power supplied from the power manager 170. For example, the power manager 170 may supply power to the buffer memory 130 and the nonvolatile memory 150. The buffer memory 130 and the nonvolatile memory 150 may generate a read voltage and a write voltage by means of the power supplied from the power manager 170, and may output or store data in response to the read voltage and the write voltage.

Each of the operation processor 110, the buffer memory 130, the nonvolatile memory 150, and the power manager 170 may be implemented in separate circuits or separate devices (e.g., separate chips). Alternatively, some of the operation processor 110, the buffer memory 130, the nonvolatile memory 150, and the power manage 170 may be implemented together in a single chip or a single device (e.g., a single integrated circuit chip). In another embodiment, some or all of the operation processor 110 is implemented in a multi-chip module. The operation processor 110, the buffer memory 130, the nonvolatile memory 150, and the power manager 170 may be implemented in various forms to obtain the electronic device 100.

Figure 2:
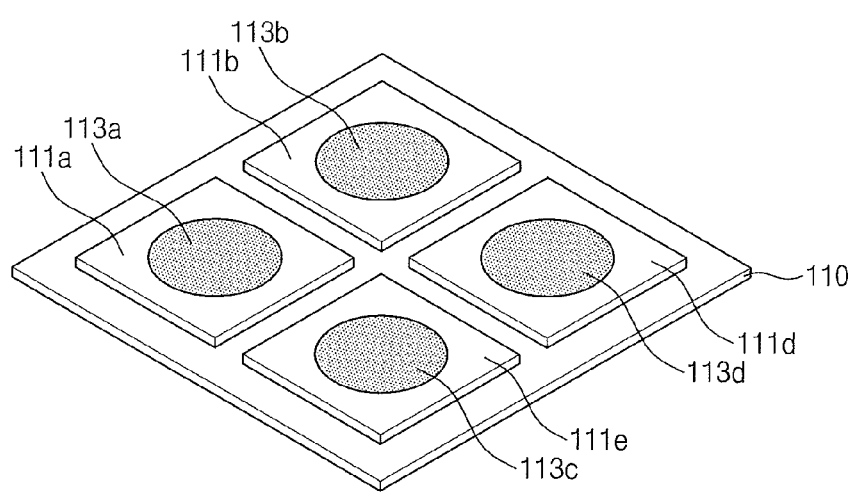
FIG. 2 is a perspective view of an embodiment of the operation processor of FIG. 1.

FIG. 2 is a perspective view of an embodiment of the operation processor 110 of FIG. 1. However, the example configuration shown in FIG. 2 is merely provided to facilitate understanding, and is not intended to limit the present disclosure. In other embodiments, the operation processor 110 includes a plurality of operation processing cores on a monolithic substrate. In another embodiment, the operation processor 110 includes operation processing cores that are overlap one another in a three dimensional (3D) package.

The operation processor 110 may include a plurality of operation processing cores 111a, 111b, 111c, and 111d (generally 111). For example, the operation processing cores 111 may share a single die in a single semiconductor package, but the present disclosure is not limited to this example. For example, the operation processing cores 111 may be implemented in a single operation processor device or a single operation processor circuit chip.

As described with reference to FIG. 1, each of the operation processing cores 111 may include a special-purpose processor circuit to perform any operation(s). The operation processing cores 111 may be connected to each other through conducting lines (e.g., wire patterns, or trace patterns) that are provided inside the shared die or on the shared die. The operation processing cores 111 may communicate with each other through the conducting lines. The operation processing cores 111 may exchange operation results with each other through the conducting lines.

Each of the operation processing cores 111 may either operate or not operate independently. For example, the first operation processing core 111a may either operate or not operate irrespective of whether the second operation processing core 111b operates or does not operate. For example, the first operation processing core 111a may independently process operations irrespective of contents of operations processed in the second operation processing cores 111b. As each of the operation processing cores 111 operates in parallel (e.g., simultaneously or concurrently), performance of the operation processor 110 may be improved, comparing to an operation processor including a single core. For example, the power manager 170 may supply power to an operation processing core that is operating. Similarly, the power manager 170 may not supply power to an operation processing core that does not operate.

When all the operation processing cores 111 are operating at the same time, the operation performance of the operation processor 110 may be maximized. However, when the operation processing cores 111 are operating together, temperatures of the operation processor 110 and the electronic device 100 in FIG. 1 may increase. Heat emission from the operation processor 110 and the electronic device 100 may cause power consumption to increase. Moreover, when the operation processor 110 and the electronic device 100 operate at high temperature for a long period of time, electric or electronic circuits may be deteriorated and the life of the operation processor 110 and the electronic device 100 may be shortened.

In some cases, the operation processor 110 may not have to operate with maximum performance. For example, when the operation of the electronic device 100 is in an idle state or when a command provided from the user 10 of FIG. 1 is to be processed only using simple operations, some of the operation processing cores 111 may not operate. In this case, the operation performance of the operation processor 110 is lowered, but heat emission, power consumption, and component life (e.g. reliability) are improved. In this manner, operations of the operation processing cores 111 may be controlled with consideration for various combinations of operation performance, power consumption, and component life of the electronic device 100 and the operation processor 110.

In some example embodiments, the operation processor 110 may include at least one temperature sensor. For example, the operation processor 110 may include temperature sensors 113a, 113b, 113c, and 113d (generally 113). The temperature sensors 113a, 113b, 113c and 113d may sense temperatures of the operation processing cores 111a, 111b, 111c, and 111d respectively. For example, the first temperature sensor 113a may sense the temperature of the first operation processing core 111a, and the second temperature sensor 113b may sense the temperature of the second operation processing core 111b.

Each of the operation processing cores 111 may recognize its own temperature or a temperature of another operation processing core or both its own temperature and the temperature of another core, based on sensing results of the temperature sensors 113. For example, the operation processing cores 111 may exchange data associated with the sensed temperature of an operation processing core through the conducting lines.

In some example embodiments, the operation processing cores 111 may either operate or not operate based on the sensing result of the temperature sensors 113. For example, when the temperature of the first operation processing core 111a increases to a value equal to or greater than a reference value, the performance of the first operation processing core 111a may be degraded and the life of the first operation processing core 111a may be shortened. Thus, the first operation processing core 111a may stop operating.

In the above example, the first operation processing core 111a may determine for itself to stop operating based on the sensing result of the first temperature sensor 113a. Alternatively, the second operation processing core 111b that is operating may intervene in stopping the operation of the first operation processing core 111a based on the sensing result of the first temperature sensor 113a.

For example, when the first operation processing core 111a stops operating in response to the temperature of the first operation processing core 111a increasing, the third operation processing core 111c may start to operate. For example, before the first operation processing core 111a completely stops operating, the third operation processing core 111c may start operating to process operations in place of the first operation processing core 111a. For example, the second operation processing core 111b that is operating may control power supply and signal processing such that the third operation processing core 111c starts to operate.

The operation processing cores 111 may operate or not operate based on the sensing results of the temperature sensors 113. Alternatively, each of the operation processing cores 111 may intervene in the operation of another operation processing core based on the sensing results of the temperature sensors 113.

As illustrated in FIG. 2, the temperature sensors 113 may be disposed on the operation processing cores 111 respectively. However, the present disclosure is not limited the configuration of FIG. 2. The temperature sensors 113 may be disposed inside the operation processing cores 111, or may be disposed below the operation processing cores 111. Disposing the temperature sensors 113 may be variously changed or modified.

As illustrated in FIG. 2, a single temperature sensor may correspond to a single operation processing core. However, in some example embodiments, a plurality of temperature sensors may be provided to sense a temperature of a single operation processing core. Alternatively, a single temperature sensor may be provided to sense temperatures of a plurality of operation processing cores. Implementing the temperature sensors 113 may be variously changed and modified.

As illustrated in FIG. 2, the operation processing cores 111 may be disposed at spatially different positions. Herein, the term "spatially different positions" or "spatially dispersed" may mean that the operation processing cores 111 do not overlap each other. Suitable spaces may be provided between the operation processing cores 111, to readily release heat that is generated by the operation processing cores 111. Suitable spaces may be vertical where cores are arranged on top of one another, or horizontal where cores are arranged beside each other on a single plane, or both. Temperature sensing may be performed by a separate device from the processing core, or in some embodiments by a diode being part of the processing core.

As described with reference to FIG. 1, the electronic device 100 may store the core data (e.g., the data associated with the operation processing cores 111). For example, the core data may include data associated with positions of operation processing cores. In some example embodiments, the core data may include data associated with absolute coordinates where the operation processing cores 111 are disposed. In some example embodiments, the core data may include data associated with relative positions of the operation processing cores 111 (e.g., a direction in which the second operation processing core 111b is disposed with respect to the first operation core 111a, or a distance between the first operation processing core 111a and the second operation processing core 111b).

Each of the operation processing cores 111 may recognize a position of another operation processing core based on the core data. The operation processing cores 111 may either operate or not operate based on the core data. In some example embodiments, the operation processing cores 111 may either operate or not operate to maximize a distance(s) between operation processing cores that are operating. The longer a distance is between operation processing cores that are operating, the better the heat generated by the operation processing cores 111 may be removed from the operation processing cores. Additionally, "hot spots" or concentrated areas of heat are spread out over a larger surface area thus improving the efficiency of heat removal methods such as airflow or conductive heat transfer (e.g. with heat-sinks). Increase the separation of two or more operating cores will also reduce the contribution of heat that one core imposes on the other core.

As illustrated in FIG. 1, the nonvolatile memory 150 may store the core data. However, the present disclosure is not limited to the configuration of FIG. 1. In some example embodiments, the core data may be inserted into an instruction code(s) of software or firmware, such that the core data may be loaded when the software or the firmware is executed. In some example embodiments, the core data may be physically stored in a hardware memory. For example, the core data may be physically written into at least one of a ROM, a register, or a one-time programmable (OTP) memory. The core data may be stored in various ways to be processed by the operation processing cores 111. In the example embodiments, each of the operation processing cores 111 may either operate or not operate depending upon a temperature, a spatial position or both the temperature and spatial position. These example embodiments will be described in detail later with reference to FIG. 3 to FIG. 15.

As illustrated in FIG. 2, the operation processor 110 may include four operation processing cores 111 and four temperature sensors 113. However, FIG. 2 is merely provided to facilitate understanding, and is not intended to limit the present disclosure. The number of operation processing cores may be variously changed or modified depending on various factors, such as purposes, functions, and performance of the electronic device 100 and the operation processor 110. For brevity, the following example embodiments assume that the operation processor 110 includes four operation processing cores 111 and four temperature sensors 113.

Figure 3:
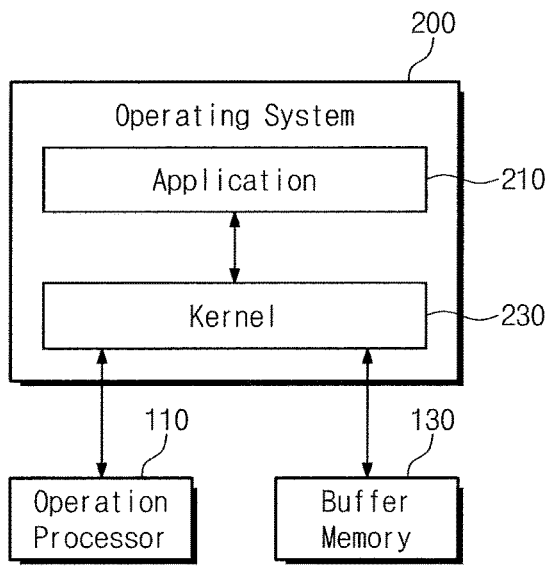
FIG. 3 is a block diagram illustrating an operation scheme of the operation processor of FIG. 1.

FIG. 3 is a functional block diagram illustrating an operation scheme of the operation processor 110 of FIG. 1. To facilitate understanding, FIG. 1 will be referred together with FIG. 3. As described with reference to FIG. 1, the nonvolatile memory 150 may store data of software, firmware or both software and firmware. For example, the software or the firmware may include an operating system (OS) 200 to control the overall operations of the electronic device 100. The operation processor 110 may execute instruction codes of the operating system 200 to manage operations of the electronic device 100. The operating system 200 may be executed to process interfacing between hardware components of the electronic device 100, software executed in the electronic device 100, and the user 10.

For example, the operating system 200 may include an application section 210 and a kernel section 230. The application section 210 may provide an operation environment required to execute various application programs in the electronic device 100. The kernel section 230 may interface the hardware components of the electronic device 100 in response to a request from the application section 210. For example, the kernel section 230 may interface the components such as the operation processor 110, or the buffer memory 130. The kernel section 230 may schedule a sequence of "tasks" to be processed by instruction sets in the operation processor 110. Herein, a task may be an operation processing unit that is controlled and managed by the operating system 200.

The kernel section 230 may allocate resources of the electronic device 100 for the tasks based on a scheduling result. Herein, the term "resource" may mean operation power of the operation processor 110 or any related component(s), (e.g., calculating the capability of the operation processor 110, or the remaining capacity of the buffer memory 130). The kernel section 230 may provide the application section 210 with results obtained by processing the tasks. The user 10 may receive any requested service through the application section 210.

Figure 4:
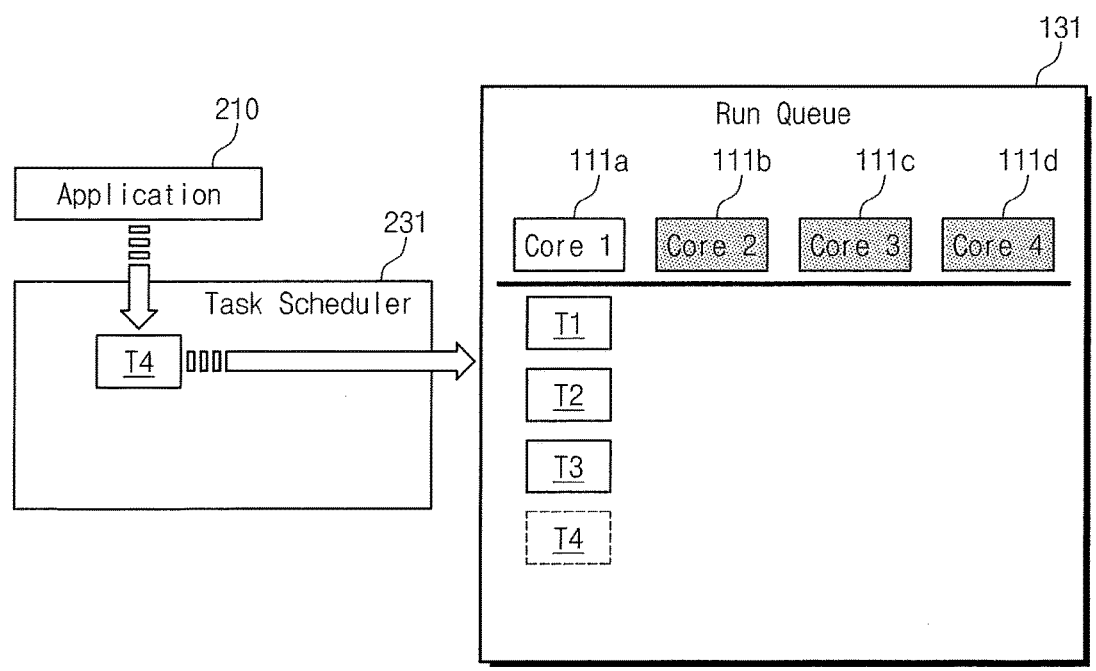
FIG. 4 is a functional block diagram showing the operations of a plurality of operation processing cores of FIG. 2.

FIG. 4 is a functional block diagram showing the operations of the plurality of operation processing cores 111 of FIG. 2. To facilitate understanding of this disclosure, FIG. 1 and FIG. 3 will be referred together with FIG. 4. The application section 210 may request the kernel section 230 to process operations required to execute an application program. The kernel section 230 may generate one or more tasks to process the requested operations.

The kernel section 230 may include a task scheduler 231. The task scheduler 231 may schedule a sequence of a plurality of tasks, based on various features of a task, such as a type, a purpose, a size of a task, or any combination thereof. For example, the task scheduler 231 may assign a higher priority to a task that is to be processed urgently. Conversely, the task scheduler 231 may assign a lower priority to a task that has a large size or requires a long processing time. The task having a higher priority may be processed ahead of the task having a lower priority.

A run queue 131 may store data of tasks to be processed by the operation processing cores 111. The operation processor 110 may access the data of the tasks stored in the run queue 131. The operation processing cores 111 may perform operations based on the data of the tasks, to process the tasks. For example, the run queue 131 may be prepared (e.g., stored) in the buffer memory 130, but the present disclosure is not limited thereto. The run queue 131 may be prepared in a cache memory of the operation processor 110, the nonvolatile memory 150, another type of memory, or any combination thereof.

The run queue 131 may store the data of the tasks based on the sequence that is scheduled by the task scheduler 231. As an example to facilitate understanding, it will be assumed that the first operation processing core 111*a* is operating and the second to fourth operation processing cores 111*b*, 111*c*, and 111*d* are not operating. Accordingly, the data of the tasks may be stored in a run queue corresponding to the first operation processing core 111*a*, and run queues corresponding to the second to fourth operation processing cores 111*b*, 111*c*, and 111*d* may not store the data of the tasks.

As an example to facilitate understanding, it will be assumed that a first task T1 has the highest priority, a second task T2 has the second priority, and a third task T3 has the third priority. In this example, the first operation processing core 111*a* may process the tasks with a sequence of the first task T1, the second task T2, and the third task T3. When a fourth task T4 having the fourth priority is provided from the task scheduler 231, data of the fourth task T4 may be stored in the last order of the run queue corresponding to the first operation processing core 111*a*.

Figure 5:
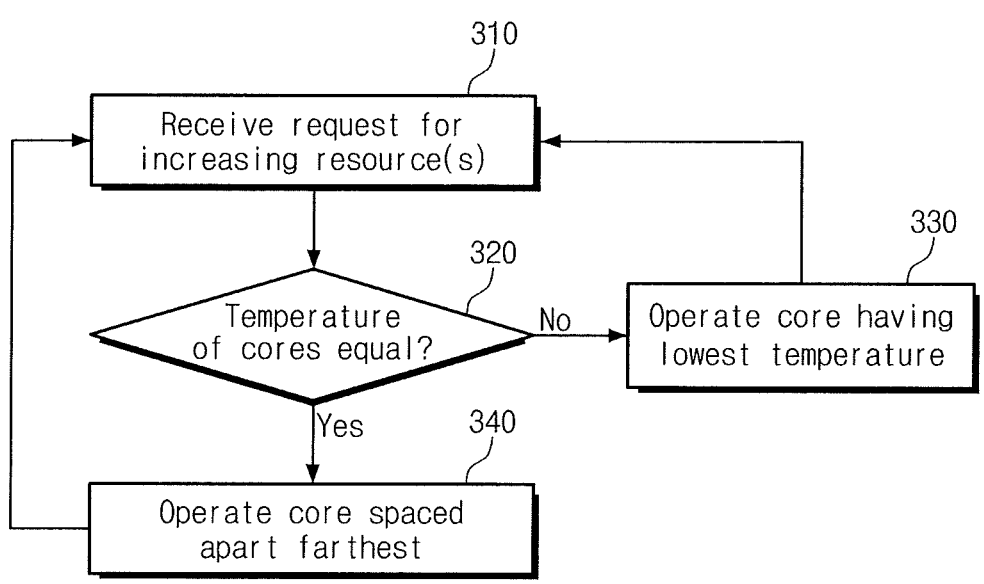
FIG. 5 is a graphical view of a method for activating the power to an operation processing core in the operation processor of FIG. 1.

FIG. 5 is a graphical view of a method for activating the power to an operation processing core in the operation processor 110 of FIG. 1. To facilitate understanding, FIG. 1, FIG. 2, and FIG. 4 will be referred together with FIG. 5. As described with reference to FIG. 2, in some cases, some of the operation processing cores 111 may operate while other operation processing cores may not operate. For example, as described with reference to FIG. 4, the first operation processing core 111*a* may be operating, and the second to fourth operation processing cores 111*b*, 111*c*, and 111*d* may not operate.

In state 310 of FIG. 5, the operation processor 110 may receive a request for increasing a resource. For example, the request for increasing a resource may be provided from the user 10 when the user 10 requests a large amount of services. For example, the request for increasing a resource may be generated inside the electronic device 100 when the run queue 131 stores data of a large amount of tasks or when complex operations are required. In some embodiments, increasing a resource includes increasing general computational resources by partitioning a task in smaller tasks that each can be run on separate processors. In other embodiments, an additional computational resource performs a task that was queued by a processor already consumed by another task. In another embodiment, an additional resource is a hardware accelerator or other dedicated computational function that is executed more efficiently than a general computational resource.

In response to the request for increasing a resource, the operation processor 110 may increase the number of operation processing cores that are operating. For example, in response to the request for increasing a resource, an operation processing core that does not operate among the operation processing cores 111 may start to operate. Accordingly, operating performance of the operation processor 110 may be improved to process a large amount of operations.

In state 320, the operation processor 110 may sense temperatures of the operation processing cores 111 by means of the temperature sensors 113. The operation processor 110 may determine whether the temperatures of the operation processing cores 111 are substantially equal to each other, based on a sensing result. Temperatures that are substantially equal may vary within an acceptable range determined in part by the accuracy of the temperature sensors 113 and thermal gradients across the processing cores 111.

When the temperatures of the operation processing cores 111 are not the same, the operation of the operation processor 110 may transition from state 320 to state 330. Conversely, when the temperatures of the operation processing cores 111 are substantially the same, the operation of the operation processor 110 may transition from state 320 to state 340. In state 330, an operation processing core that does not operate among the operation processing cores 111 may start to operate. The operation processing core selected to operate in state 330 may be an operation processing core having the lowest temperature.

As described above, when a temperature of an operation processing core increases, power consumption of the operation processor 110 may increase and the life of the operation processor 110 may be shortened. Thus, an operation processing core having the lowest temperature may start to operate, to consume the small amount of power at low temperature and to prevent the lifetime or the performance of the operation processor 110 from being deteriorated.

In state 340, an operation processing core that does not operate among the operation processing cores 111 may start to operate. The operation processing core selected to operate in state 340 may be an operation processing core spatially spaced apart farthest from an operation processing core that is operating. When a distance between operation processing cores 111 that are operating is short, heat may not be easily released (e.g. transferred from the operation processing cores 111 to a heat sink) and the overall temperature of the operation processor 110 may increase rapidly. Conversely, when the distance between operation processing cores that are operating is long, heat may be more easily released and the overall temperature of the operation processor 110 may increase slowly. Accordingly, it may be advantageous to select an operation processing core spaced far away from an operation processing core that is operating.

An operation processing core that is not operating may not be supplied with power. The operation processing core(s) selected to operate in state 330 or 340 may start to be supplied with power from the power manager 170. The selected operation processing core may start to operate in response to the power supply. Afterwards, the operation of the operation processor 110 may transition to state 310.

Figure 6:
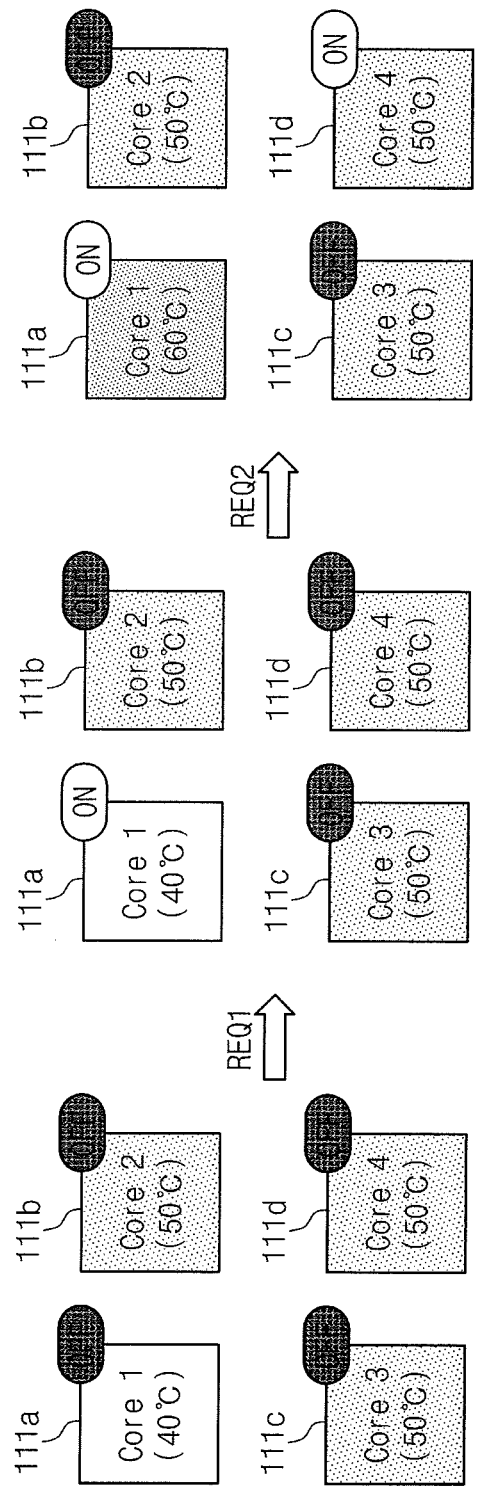
FIG. 6 is a functional block diagram showing the procedures for activating the power to an operation processing core in the operation processor of FIG. 1 according to the method shown in FIG. 5.

FIG. 6 is a functional block diagram showing the procedures for activating the power to an operation processing core in the operation processor 110 of FIG. 1 according to method shown in FIG. 5. To facilitate understanding, FIG. 1 and FIG. 2 will be referred together with FIG. 6. Referring to FIG. 6, a case where all the operation processing cores 111 do not operate is illustrated on the left side (e.g. where cores 111a, 111b, 111c and 111d are each in the "OFF" state or not operating). For example, a temperature of the first operation processing core 111a may be 40 degrees Centigrade (° C.), and a temperature of each of the second to fourth operation processing cores 111b, 111c, and 111d may be 50° C.

For example, the operation processor 110 may receive a request REQ1 for increasing a resource (see state 310 of FIG. 5). The operation processor 110 may determine whether the temperatures of the operation processing cores 111 are equal to each other, by means of the temperature sensors 113, in response to the request REQ1 (see state 320 of FIG. 5). However, the temperature of the first operation processing cores 111a may be different from the temperatures of the second to fourth operation processing cores 111b, 111c, and 111d.

Accordingly, the first operation processing core 111a having the lowest temperature may start to operate (see state 330 of FIG. 5). Referring to FIG. 6, a case where the first operation processing core 111a operates and the second to fourth operation processing cores 111b, 111c, and 111d still do not operate is illustrated on the center (e.g. where core 111a is "ON" with a temperature of 40° C., and cores 111b, 111c and 111d are each "OFF"). By operating the first operation processing core 111a having the lowest temperature, the small amount of power may be consumed at low temperature and the life of the operation processor 110 may be prevented from being shortened rapidly.

Subsequently, the operation processor 110 may receive a request REQ2 for increasing a resource (see state 310 of FIG. 5). The operation processor 110 may determine whether the temperatures of the second to fourth operation processing cores 111b, 111c, and 111d, that do not operate, are equal to each other, by means of the temperature sensors 113b, 113c, and 113d, in response to the request REQ2 (see state 320 of FIG. 5). For example, the temperatures of the second to fourth operation processing cores 111b, 111c, and 111d may be substantially the same.

Thus, the fourth operation processing core 111d spatially spaced apart farthest from the first operation processing core 111a that is operating may start to operate (see state 340 of FIG. 5). For example, the first operation processing core 111a may recognize a distance to each of the second to fourth operation processing cores 111b, 111c, and 111d with reference to core data associated with positions of the operation processing cores 111. The first operation processing core 111a may allow the fourth operation processing core 111d to operate with reference to the core data.

Referring to FIG. 6, a case where the first and fourth operation processing cores 111a and 111d operate and the second and third operation processing cores 111b and 111c do not operate is illustrated in the right side (e.g. where core 111a is "ON" with a temperature increased to 60° C., cores 111b, 111c are still "OFF" and core 111d is now activated to an "ON" state). Since the first operation processing core 111a starts operating for the first time, the temperature of the first operation processing core 111a may increase to 60° C. in one example. By operating the fourth operation processing core 111d spatially spaced apart farthest from the first operation processing core 111a, heat generated at the operation processor 110 may be easily released and the overall temperature of the operation processor 110 may not increase rapidly.

Figure 7:
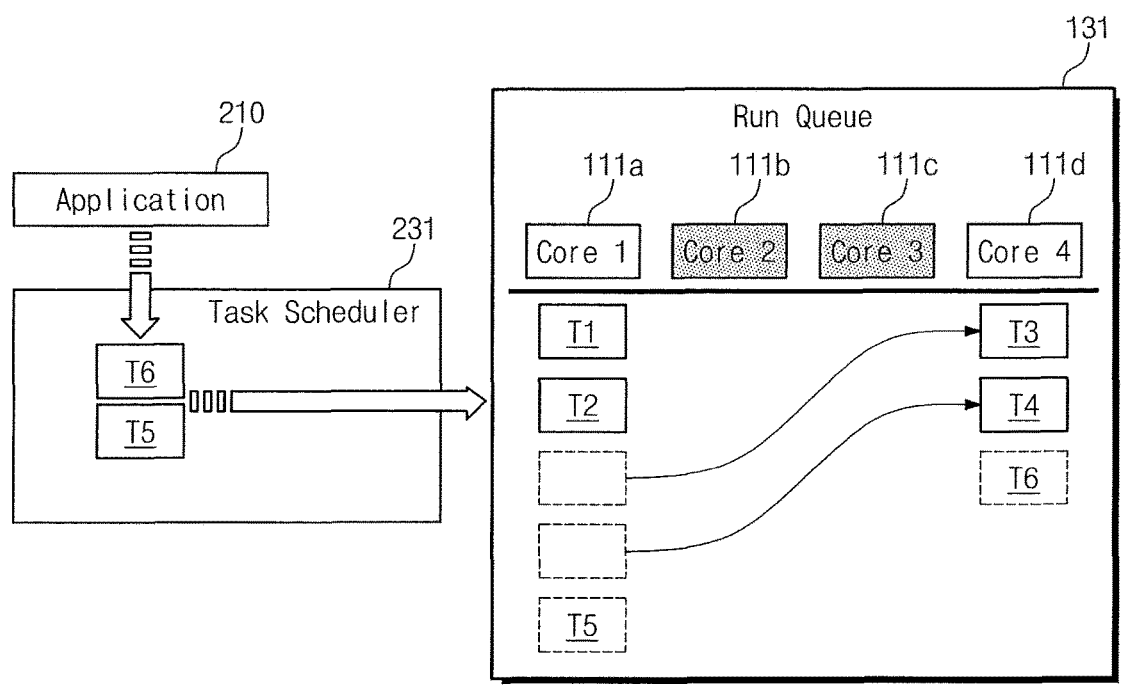
FIG. 7 is a functional block diagram showing load balancing performed when the power to an operation processing core is activated in the operation processor of FIG. 1 according to the procedures shown in FIG. 6.

FIG. 7 is a functional block diagram showing load balancing performed when the power to an operation processing core 111 is activated in the operation processor 110 of FIG. 1 according to the procedures shown in FIG. 6. To facilitate understanding, FIG. 1 and FIG. 6 will be referred together with FIG. 7. For example, while the first operation processing core 111a operates, the fourth operation processing core 111d may start to operate in response to the request REQ2 for increasing a resource. As power starts to be supplied to the fourth operation processing core 111d and the fourth operation processing core 111d operates, some data of tasks stored in a run queue corresponding to the first operation processing core 111a may migrate to a run queue corresponding to the fourth operation processing core 111d. For example, data of the third and fourth tasks T3 and T4 may migrate from the run queue corresponding to the first operation processing core 111a to the run queue corresponding to the fourth operation processing core 111d.

When two or more operation processing cores operate together, tasks may be distributed to operation processing cores that are operating, such that loads on the operating processing cores that are operating maintain in balance (e.g., "load balancing"). Thus, tasks may not be concentrated to a specific operation processing core, and the operation processor 110 may operate efficiently. In other embodiments, the core 111d includes a hardware accelerator that can more efficiently perform tasks T3 or T4. In another embodiment, tasks T3 and T4 may be combined to run on core 111d, where core 111d has a capacity to run larger tasks than core 111a, without the need to further partition tasks into separate execution threads.

Additionally, fifth and sixth tasks T5 and T6 respectively may be generated in response to a request from the application section 210. When the fifth and sixth tasks T5 and T6 are provided from the task scheduler 231, the fifth and sixth tasks T5 and T6 may be allocated separately to the first and fourth operation processing cores 111a and 111d. Thus, computational loads on each of the operation processing cores that are operating may maintain in balance.

Figures 8, 9:
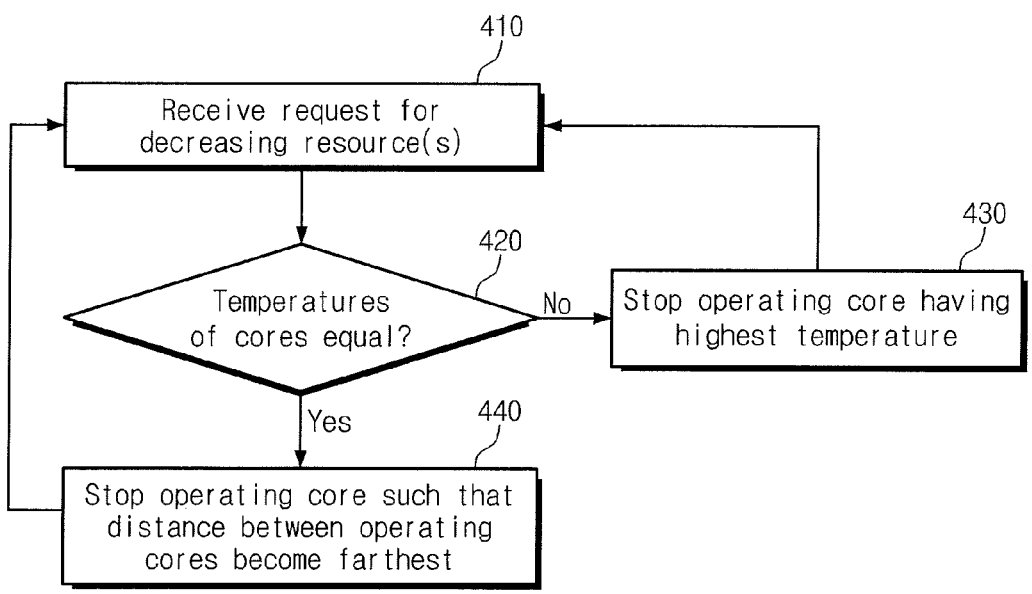
FIG. 8 is a table showing operations performed in response to a temperature increase in the operation processor of FIG. 1.
FIG. 9 is a graphical view of a method for deactivating power of an operation processing core in the operation processor of FIG. 1.

FIG. 8 is a table showing operations performed in response to a temperature increase in the operation processor 110 of FIG. 1. To facilitate understanding, FIG. 1 and FIG. 2 will be referred together with FIG. 8. As described with reference to FIG. 2, the temperature sensors 113 may be employed to sense the temperatures of the operation processing cores 111. In addition, for example, at least one of the temperature sensors 113, (or any additional temperature sensor) may sense the overall operation temperature of the electronic device 100 that is obtained according to the temperatures of the operating processing cores 111. In one embodiment, the sensed temperatures of each of the temperature sensors 113 are averaged to provide the overall operating temperature.

In some example embodiments, when a temperature of a specific operation processing core is sensed to be equal to or higher than a first threshold value Th1, a "throttling" operation may be performed. For example, in the throttling operation, an operation frequency of the specific operation processing core may decrease. In another example, an operating voltage of the specific operation processing core is reduced. As described above, the increase in a temperature of an operation processing core may affect power consumption and life. Thus, the operation frequency of the specific operation processing core may decrease to prevent the temperature of the operation processing core from continuing to increase. When the operation frequency of the operation processing core decreases, the temperature of the operation processing core may not increase rapidly.

In some example embodiments, when a temperature of a specific operation processing core is sensed to be equal to or greater than a second threshold value Th2, the specific operation processing core may be powered off. Powering off the specific operation processing core will also mitigate temperature increases of the operation processor 110 and the electronic device 100. In some example embodiments, when the overall operation temperature of the electronic device 100 is sensed to be equal to or greater than a third threshold value Th3, the electronic device 100 may be powered off. When the overall operation temperature of the electronic device 100 may be excessively high, circuits of the electronic device 100 including the operation processor 110 may be damaged. To avoid this, the electronic device 100 may be powered off, and all operation processing cores may stop operating.

The throttling operation, powering off an operation processing core, and powering off the electronic device 100 may be controlled individually or in combination by the operation processor 110. In some cases, one or more operation processing cores that are operating may control any combination of the throttling operation, powering off an operation processing core, and powering off the electronic device 100. Alternatively or additionally, some additional controller circuit(s) may be provided to control any combination of the throttling operation, powering off an operation processing core and powering off the electronic device 100.

Each of the first, second, and third threshold values Th1, Th2, and Th3 may have any value suitable to manage the electronic device 100 and its components. The operations described with reference to FIG. 8 may be performed in parallel or sequentially. This will be described in further detail later with reference to FIG. 12.

FIG. 9 is a graphical view of a method for deactivating power of an operation processing core in the operation processor 110 of FIG. 1. For example, the procedure of powering off an operation processing core may be performed when a temperature of an operation processing core increases to a value equal to or greater than the second threshold value Th2, as described with reference to FIG. 8. To facilitate understanding, FIG. 1, FIG. 2, and FIG. 4 will be referred together with FIG. 9. In state 410, the operation processor 110 may receive a request for decreasing a resource. For example, the request for decreasing a resource may be generated inside the electronic device 100 when a temperature of a specific operation processing core increases to a value equal to or greater than the second threshold value Th2.

However, the present disclosure is not limited to the above example. In some cases, the request for decreasing a resource may be generated inside the electronic device 100 when a run queue 131 stores data of the small amount of tasks or when only a simple operation is required. In some cases, the request for decreasing a resource may be generated inside the electronic device 100 when an operation of the electronic device 100 is in an idle state.

In response to the request for decreasing a resource, the operation processor 110 may decrease the number of operation processing cores that are operating. For example, in response to the request for decreasing a resource, an operation processing core that is operating among the operation processing cores 111 may stop operating. This is because high operation performance may not be required to process the small amount of operations. By stopping operations of some operation processing core(s), power consumption of the operation processor 110 and the electronic device 100 may be reduced.

In state 420, the operation processor 110 may sense the temperatures of the operation processing cores 111 by means of the temperature sensors 113. The operation processor 110 may determine whether the temperatures of the operation processing cores 111 are substantially equal to each other, based on at least one sensing result.

When the temperatures of the operation processing cores 111 are not the same, the operation of the operation processor 110 may transition from state 420 to state 430. Conversely, when the temperatures of the operation processing cores 111 are the same, the operation of the operation processor 110 may transition from state 420 to state 440. In state 430, an operation processing core that is operating among the operation processing cores 111 may stop operating. The operation processing core selected to stop operating in state 430 may be an operation processing core having the highest temperature. As described above, when a temperature of an operation processing core increases, the life of the operation processor 110 may be shortened. Thus, the operation processing core having the highest temperature may stop operating, to consume the small amount of power at low temperature and to prevent the operation processor 110 from being deteriorated.

In state 440, an operation processing core that is operating among the operation processing cores 111 may stop operating. An operation processing core to stop operating in state 440 may be selected such that a spatial distance between operation processing cores that continue to operate becomes farthest. When a distance between the operation processing cores that are operating is short, heat generated by the operation processor 110 may not be readily released and the overall temperature of the operation processor 110 may increase rapidly. Conversely, when a distance between the operation processing cores that are operating is long, the heat may be easily released and the overall temperature of the operation processor 110 may increase slowly. Accordingly, it may be advantageous to allow the distance between the operation processing cores that are operating to increase.

An operation processing core that is operating may receive power from the power manager 170. Power supply to the operation processing core(s) selected in state 430 or 440 may be interrupted. The selected operation processing core(s) may stop operating. Afterwards, the operation of the operation processor 110 may transition to state 410.

Figure 10:
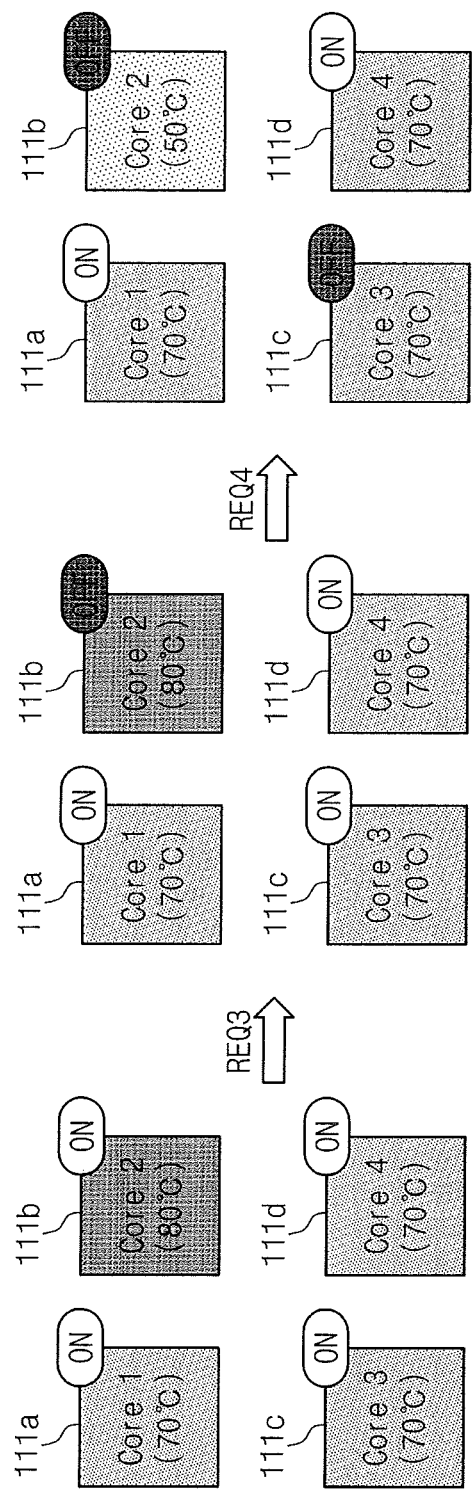
FIG. 10 is a functional block diagram showing the procedures of deactivating power to an operation processing core in the operation processor of FIG. 1 according to the method shown in FIG. 9.

FIG. 10 is a functional block diagram showing the procedures of deactivating power to an operation processing core in the operation processor 110 of FIG. 1 according to the method shown in FIG. 9. To facilitate understanding, FIG. 1 and FIG. 2 will be referred together with FIG. 10. Referring to FIG. 10, a case where all the operation processing cores 111 operate is illustrated in the left side (e.g. where each of cores 111a, 111b, 111c and 111d is "ON"). For example, the temperature of the second operation processing core 111b may be 80° C., and the temperature of each of the first, third, and fourth operation processing cores 111a, 111c, and 111d may be 70° C. For example, in the following description, it will be assumed that an operation processing core having a temperature equal to or greater than 80° C. stops operating (e.g. Th2=80° C.).

For example, the operation processor 110 may receive a request for decreasing a resource (see state 410 of FIG. 9). The operation processor 110 may determine whether the temperatures of the operation processing cores 111 are substantially equal to each other, by means of the temperature sensors 113, in response to the request REQ3 (see state 420 of FIG. 9). However, the temperature of the second operation processing core 111b may be different from the temperatures of the first, third, and fourth operation processing cores 111a, 111c, and 111d.

Thus, the second operation processing core 111b having the highest temperature may stop operating (see state 430 of FIG. 9). Referring to FIG. 10, a case where the second operation processing core 111b does not operate and the first, third, and fourth operation processing cores 111a, 111b, and 111d operate is illustrated in the center, (e.g. where cores 111a, 111c and 111d are "ON", and core 111b is now turned "OFF"). As the second operation processing core 111b having the highest temperature stops operating, the small amount of power may be consumed at low temperature and the life of the operation processor 110 may be prevented from being shortened.

Subsequently, the operation processor 110 may receive the request REQ4 for decreasing a resource (see state 410 of FIG. 9). The operation processor 110 may determine whether the temperatures of the first, third, and fourth operation processing cores 111a, 111c, and 111d are substantially equal to each other, by means of the temperature sensors 113a, 113c, and 113d, in response to the request REQ4 (see state 420 of FIG. 9). For example, the temperatures of the first, third, and fourth operation processing core 111a, 111c, and 111d may be substantially the same.

Accordingly, the third operation processing core 111c may stop operating such that a spatial distance between operation processing cores that continue to operate becomes longest, (e.g., the first operation processing core 111a and the fourth operation processing core 111d continue to operate (see state 440 of FIG. 9). For example, at least one of the first, third, and fourth operation processing cores 111a, 111c, and/or 111d may recognize distances between the operation processing cores 111 with reference to core data associated with positions of the operation processing cores 111. Based on the core data, the first and fourth operation processing cores 111a and 111d may continue to operate, and the third operation processing core 111c may stop operating.

Referring to FIG. 10, a case where the first and fourth operation processing cores 111a and 111d operate and the second and third operation processing cores 111b and 111c do not operate is illustrated in the right side (e.g. where cores 111a and 111d are "ON", and cores 111b and 111c are "OFF"). Since the second operation processing core 111b stops operating in advance, the temperature of the second operation processing core 111b may decrease down to, for example, 50° C. By operating the first and fourth operation processing cores 111a and 111d that are spaced far away from each other, heat generated at the operation processor 110 may be released readily and the overall temperature of the operation processor 110 may not increase rapidly.

Figure 11:
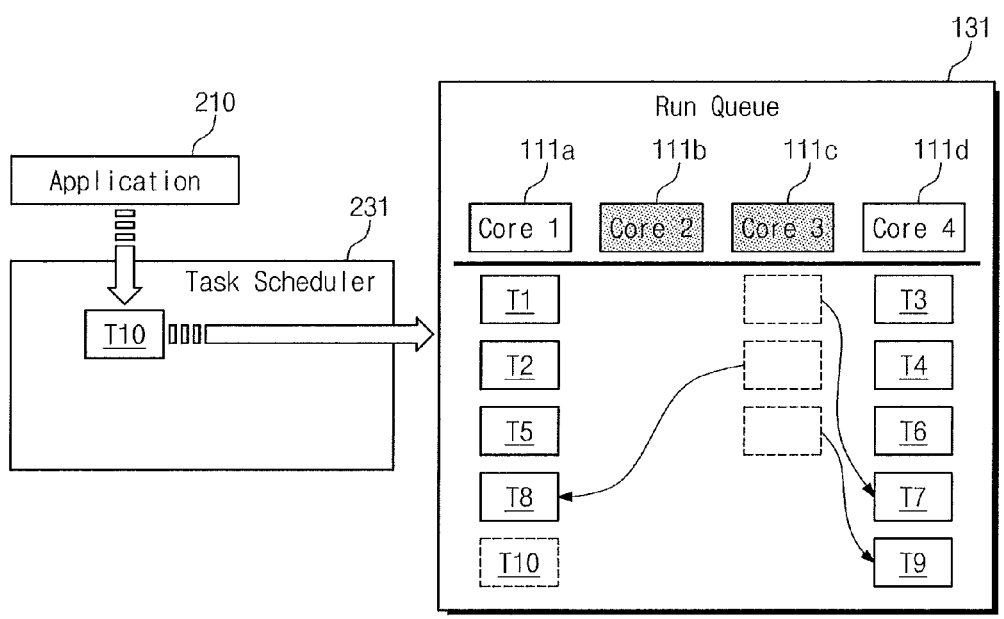
FIG. 11 is a functional block diagram showing load balancing performed when the power to an operation processing core is deactivated in the operation processor of FIG. 1 according to the procedures shown in FIG. 10.

FIG. 11 is a functional block diagram showing load balancing performed when the power to an operation processing core is deactivated in the operation processor 110 of FIG. 1 according to the procedures shown in FIG. 10. To facilitate understanding, FIG. 1 and FIG. 10 will be referred together with FIG. 11.

For example, after the second operation processing core 111b stops operating, the third operating processing core 111c may stop operating in response to the request REQ4 for decreasing a resource. As the third operation processing core 111c stops operating, data of tasks stored in a run queue corresponding to the third operation processing core 111c may migrate to at least one of run queues corresponding to the first and fourth operation processing cores 111a and 111d.

For example, data of seventh and ninth tasks T7 and T9 respectively may migrate from the run queue corresponding to the third operation processing core 111c to the run queue corresponding to the fourth operation processing core 111d, and data of an eighth task T8 may migrate from the run queue corresponding to the third operation processing core 111c to the run queue corresponding to the first operation processing core 111a. When two or more operation processing cores operate together, tasks may be distributed to operation processing cores that are operating, such that loads on the operation processing cores that are operating maintain in balance. Additionally, a tenth task T10 may be generated in response to a request of the application section 210. When the tenth task T10 is provided from the task scheduler 231, the tenth task T10 may be allocated to the first operation processing core 111a. Thus, loads on the operation processing cores that are operating (e.g. 111a and 111d) may maintain in balance.

Figure 12:
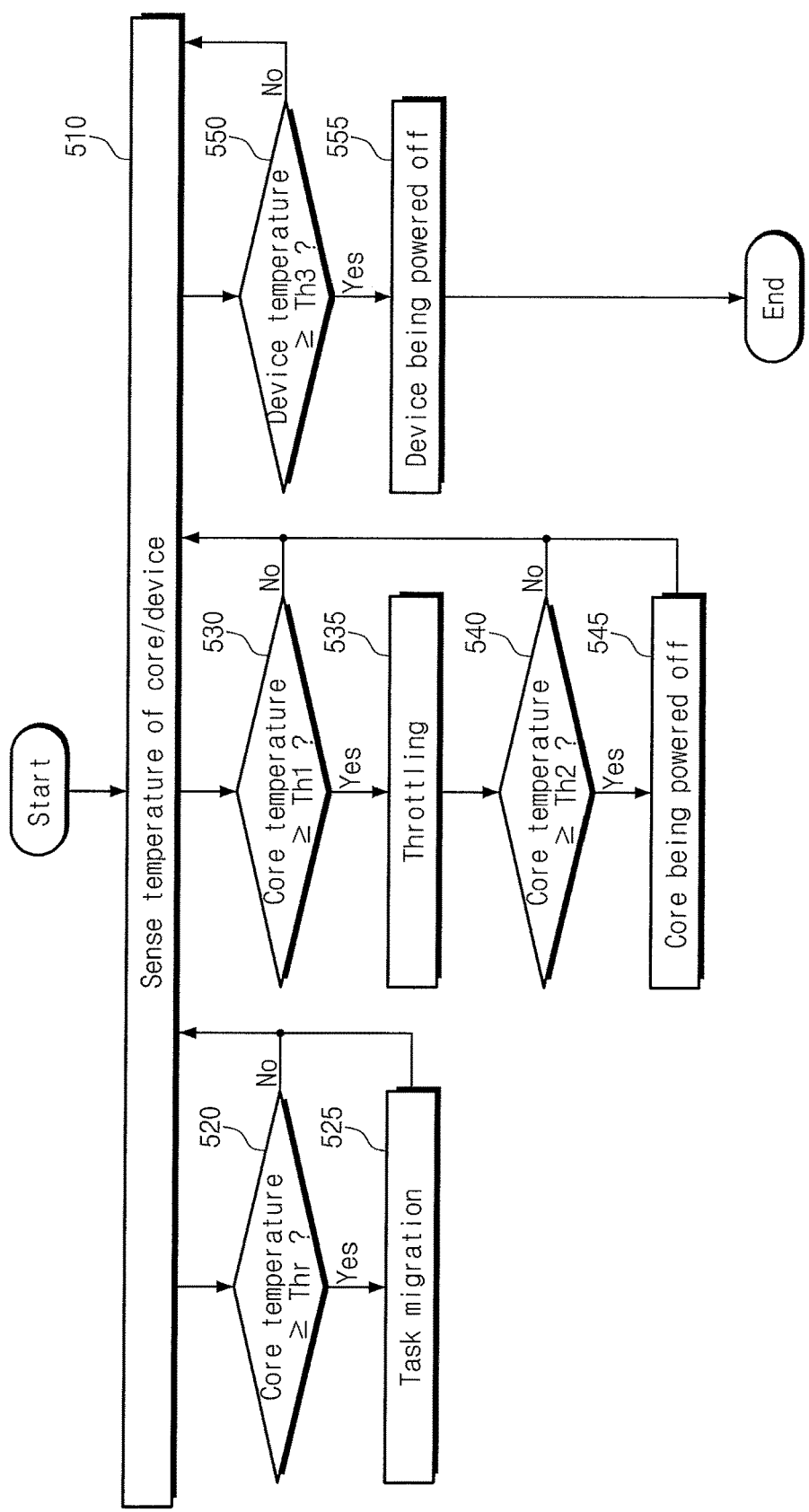
FIG. 12 is a graphical view of a method showing operations performed based on a temperature that is sensed in the operation processor of FIG. 1.

FIG. 12 is a graphical view of a method showing operations performed based on a temperature that is sensed in the operation processor 110 of FIG. 1. To facilitate understanding, FIG. 1, FIG. 2, and FIG. 8 will be referred together with FIG. 12. In operation 510, temperatures of the plurality of operation processing cores 111, the electronic device 100, or both may be sensed. For example, the temperature sensors 113 may sense the temperatures of the operation processing cores 111, the electronic device 100, or both. Operation 510 may be performed in response to a request from the user 10 or the electronic device 100. Alternatively, operation 510 may be performed periodically, or may be performed whenever a specific condition is satisfied.

For example, in operation 520, a determination may be made as to whether a temperature of a specific operation processing core is equal to or higher than a reference value Thr. The determination of operation 520 may be performed by an operation processing core that is operating. The reference value Thr may have a value suitable to manage operations of the operation processing cores 111. The suitable value may be obtained by any combination of test(s), experiment(s), and machine learning.

When the temperature of the specific operation processing core is equal to or higher than the reference value Thr, operation 525 may be performed. In operation 525, a task migration operation may be performed. The task migration operation may be performed to prevent the temperatures of the electronic device 100 and the operation processor 110 including the operation processing cores 111 from increasing. The task migration operation will be described in detail later with reference to FIG. 13, FIG. 14 and FIG. 15. When the task migration operation is completed or the temperature of the specific operation processing core is less than the reference value Thr, operation 510 may be performed again.

In operation 530, a determination may be made as to whether a temperature of a specific operation processing core is equal to or greater than a first threshold value Th1. The determination of operation 530 may be performed by an operation processing core that is operating. When the temperature of the specific operation processing core is equal to or greater than the first threshold value Th1, a throttling operation may be performed in operation 535. The first threshold value Th1 and the throttling operation have been described with reference to FIG. 8.

In operation 540, a determination may be made as to whether the temperature of the specific operation processing core is equal to or higher than a second threshold value Th2. The determination of operation 540 may be performed by an operation processing core that is operating. When the temperature of the specific operation processing core is equal to or higher than the second threshold value Th2, the specific operation processing core may be powered off in operation 545. The second threshold value Th2 and the power-off of the core have been described with reference to FIG. 8 to FIG. 11. When the temperature of the specific operation processing core is less than the first and second threshold values Th1 and Th2 or when the core is powered off, operation 510 may be performed again.

As described with reference to FIG. 12, the determination of operation 530 may be performed ahead of the determination of operation 540. However, in some example embodiments, the determination of operation 540 may be performed ahead of the determination of operation 530. Alternatively, the determination of operation 530 and the determination of operation 540 may be performed in parallel (e.g., simultaneously or concurrently).

In operation 550, a determination may be made as to whether an operation temperature of the electronic device 100 is equal to or greater than a third threshold value Th3. The determination of operation 550 may be performed by an operation processing core that is operating. When the operation temperature of the electronic device 100 is equal to or greater than the third threshold value Th3, the electronic device 100 may be powered off in operation 555. The third threshold value Th3 and the power-off of the electronic device 100 have been described with reference to FIG. 8. When the operation temperature of the electronic device 100 is less than the third threshold value Th3, operation 510 may be performed again. When the electronic device 100 is powered off, the procedures of FIG. 12 may be ended.

Some or all of the reference value Thr and the first to third threshold values Th1, Th2, and Th3 respectively may have the same value. Alternatively, the reference value Thr and the first to third threshold values Th1, Th2, and Th3 may have different values. In various embodiments, the evaluation performed at 520, 530, 540, and 550 includes thermal hysteresis.

Unlike the illustration in FIG. 12, in some example embodiments, operations 520, 530, 540, and 550 may be sequentially performed. For example, when a temperature of a specific operation processing core increases to a value that is equal to or greater than the reference value Thr, a task migration operation may be performed to decrease the temperature of the operation processor 110. When the temperature of the specific operation processing core increases to the value that is equal to or greater than the first threshold value Th1 in spite of the task migration operation, a throttling operation may be performed to decrease the temperature of the operation processor 110. When the temperature of the specific operation processing core increases a value that is equal to or greater than the second threshold value Th2 in spite of the throttling operation, the specific operation processing core may be powered off to decrease the temperature of the operation processor 110. Nonetheless when the operation temperature of the electronic device 100 increases excessively, the electronic device 100 may be powered off. In such the above manner, the operation processor 110 and the electronic device 100 may consume the small amount of power at low temperature while operating with maximum performance. Moreover, the life of the operation processor 110 may not decrease rapidly.

Figure 13:
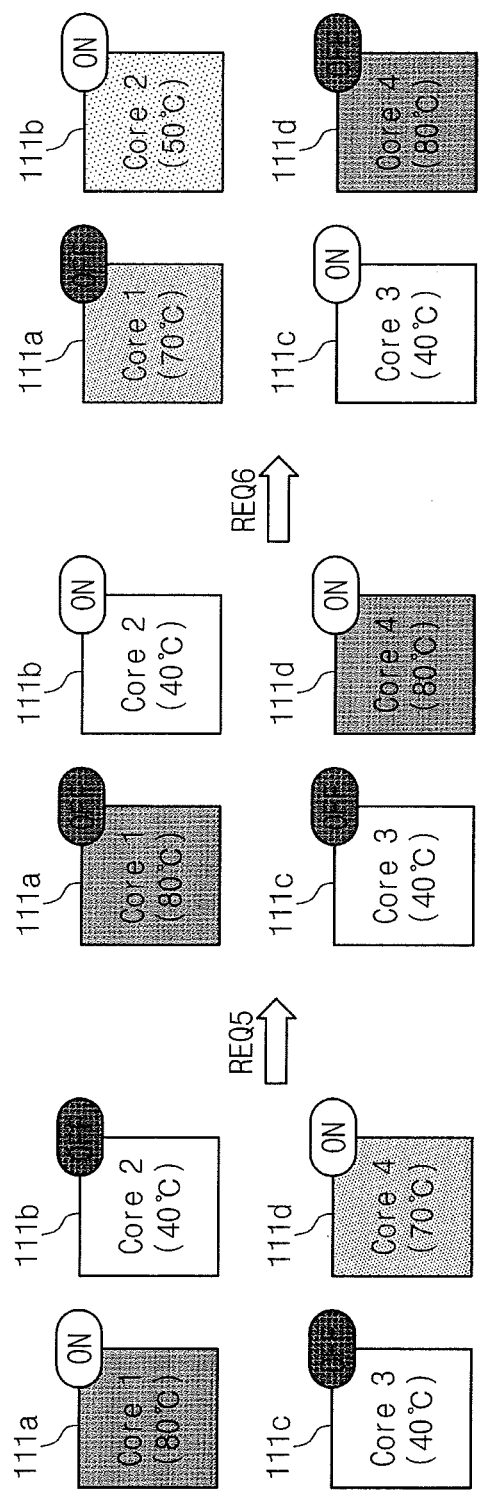
FIG. 13 is a functional block diagram showing the management of an operation processing core with a task migration operation shown in FIG. 12 in the operation processor of FIG. 1, FIG. 14 and FIG. 15 are functional block diagrams showing a task migration operation performed in the operation processor of FIG. 1 according to the procedure shown in FIG. 13.

FIG. 13 is a functional block diagram showing the management of an operation processing core with a task migration operation shown in FIG. 12 in the operation processor 110 of FIG. 1. To facilitate understanding, FIG. 1 and FIG. 2 will be referred together with FIG. 13.

Referring to FIG. 13, a case where the first and fourth operation processing cores 111a and 111d operate and the second and third operation processing cores 111b and 111c do not operate is illustrated in the left side, (e.g. where cores 111a and 111d are "ON", and cores 111b and 111c are "OFF"). For example, the temperatures of the first and fourth operation processing cores 111a and 111d may be 80° C. and 70° C. respectively, and the each temperature of the second and third operation processing cores 111b and 111c may be 40° C.

For example, the operation processor 110 may receive a request REQ5 associated with the task migration operation. For example, the request REQ5 associated with the task migration operation may be generated inside the electronic device 100 when a temperature of a specific operation processing core is equal to or greater than the reference value Thr (see operation 510 of FIG. 12). In the following description, it will be assumed that the task migration operation is performed when the temperature of the specific operation processing core is equal to or greater than 80° C. (i.e., Thr=80° C.).

For example, when the temperature of the first operation processing core 111a increases to 80° C., the request REQ5 associated with the task migration operation may be generated. The first operation processing core 111a may stop operating in response to the request REQ5, (e.g. the power supply to the first operation processing core 111a may be interrupted). However, when the first operation processing core 111a stops operating, operation performance of the operation processor 110 may be degraded. Another operation processing core that does not operate may start to operate, to maintain the operation performance of the operation processor 110.

In some example embodiments, the operation processing core to start to operate may be selected as an operation processing core having the lowest temperature among operation processing cores that do not operate. In FIG. 13, for example, one of the second and third operation processing cores 111b and 111c having a temperature of 40° C. may be selected. For example, the second operation processing core 111b may be selected. Power supply to the selected second operation processing core 111b may be started in response to the request REQ5. The second operation processing core 111b may start to operate in response to the power supply.

Referring to FIG. 13, a case where the first operation processing core 111a stops operating and the second operation processing core 111b starts operating is illustrated in the center, (e.g. where cores 111b and 111d are "ON", and cores 111a and 111c are "OFF"). By stopping the operation of the first operation processing core 111a having the highest temperature and operating the second operation processing core 111b having the lowest temperature, less power may be consumed at a low temperature and the life of the operation processor 110 may be extended.

Subsequently, the operation processor 110 may receive a request REQ6 associated with a task migration operation. For example, when the temperature of the fourth operation processing core 111d increases to a temperature of 80° C., the request REQ6 associated with the task migration operation may be generated. The fourth operation processing core 111d may stop operating in response to the request REQ6. That is, power supply to the fourth operation processing core 111d may be interrupted.

Another operation processing core may start to operate, to maintain the operation performance of the operation processor 110. In some example embodiments, the operation processing core to start to operate may be selected as an operation processing core that is spatially spaced apart farthest from an operation processing core that is operating. For example, although the temperature of the first operation processing core 111a decreases down to 70° C., the third operation processing core 111c is selected because it is spaced apart farthest from the second operation processing core 111b.

For example, the second operation processing core 111b that is operating may determine a spatial distance to each of the first and third operation processing cores 111a and 111c, with reference to core data associated with spatial positions of the operation processing cores 111. The second operation processing core 111b may select the third operation processing core 111c based on a determination result. Power supply to the selected third operation processing core 111c may be started in response to the request REQ6. The third operation processing core 111c may start operating in response to the power supply.

Referring to FIG. 13, a case where the third operation processing core 111c starts operating and the fourth operation processing core 111d stops operating is illustrated in the right side, (e.g. where cores 111b and 111c are "ON", and cores 111a and 111d are "OFF"). Because the second operation processing core 111b starts operating in advance ahead of the third operation processing core 111c, the temperature of the second operation processing core 111b may increase to 50° C. in one example.

Consequently, an operating processing core having a temperature that is equal to or greater than the reference value Thr may stop operating, and other operation processing core may start operating. For example, when the temperature of the second operation processing core Mb increases to a temperature equal to or greater than 80° C., the second operation processing core 111b may also stop operating. To readily release heat and to prevent the overall temperature of the operation processor 110 from increasing rapidly, it may be advantageous to allow a distance between operation processing cores that are operating to increase.

Figure 14:
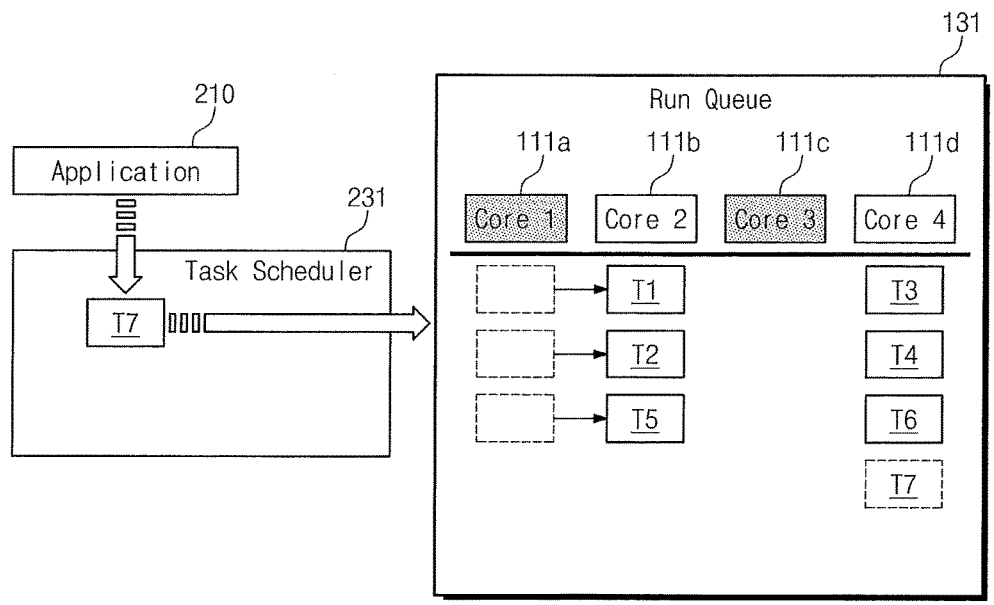

FIG. 14 is a functional block diagram showing a task migration operation performed in the operation processor 110 of FIG. 1 according to the procedure shown in FIG. 13. For example, FIG. 14 illustrates a task migration operation performed in response to the request REQ5 of FIG. 13. To facilitate understanding, FIG. 1 and FIG. 13 will be referred together with FIG. 14.

For example, in response to the request REQ5 associated with a task migration operation, the second operation processing core 111b may start to operate and the first operation processing core 111a may stop operating. Thus, data of tasks stored in a run queue corresponding to the first operation processing core 111a may migrate to a run queue corresponding to the second operation processing core Mb (e.g. "task migration"). For example, data of the first, second, and fifth tasks T1, T2, and T5 may migrate from the run queue corresponding to the first operation processing core 111a to the run queue corresponding to the second operation processing core 111b. The task migration operation may be processed by an operation processing core that starts operating, an operating processing core that is operating, or both. For example, at least one of the second and fourth operation processing cores 111b and 111d may process the task migration operation for the second operation processing core 111b.

Additionally, a seventh task T7 may be generated in response to a request from the application section 210. When the seventh task T7 is provided from the task scheduler 231, the seventh task T7 may be allocated to the fourth operation processing core 111d. In this case, data of the seventh task T7 may be stored in a run queue corresponding to the fourth operation processing core 111d. While the task migration operation is performed for the second operation processing core 111b, the fourth operation processing core 111d may process the additional task T7 to reduce a load on the second operation processing core 111b.

Figure 15:
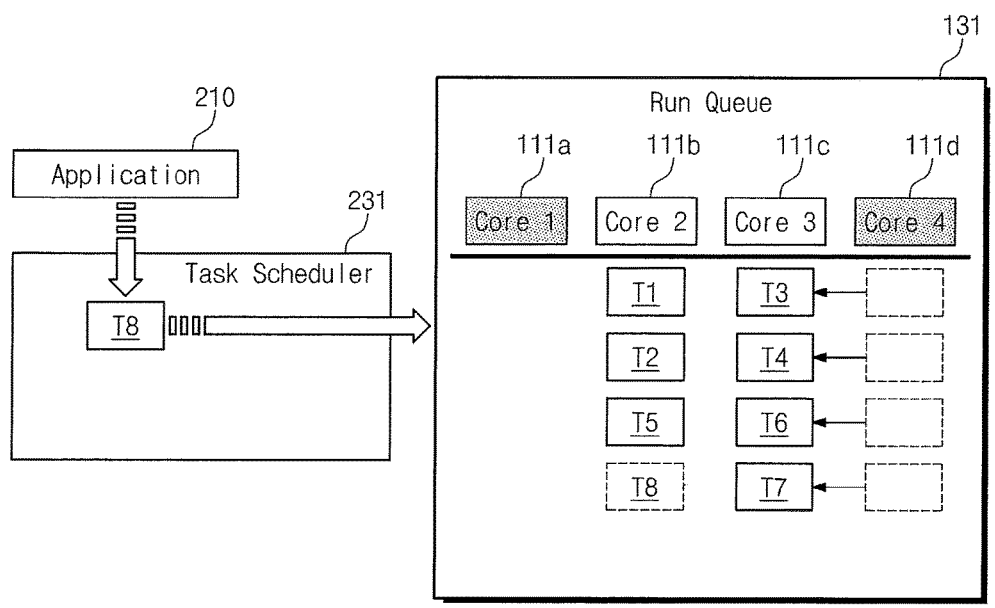

FIG. 15 is a functional block diagram showing a task migration operation performed in the operation processor 110 of FIG. 1 according to the procedure shown in FIG. 13.

For example, FIG. 15 illustrates a task migration operation performed in response to the request REQ6 of FIG. 13. To facilitate understanding, FIG. 1 and FIG. 13 will be referred together with FIG. 15. For example, in response to the request REQ6 associated with a task migration operation, the third operation processing core 111c may start to operate and the fourth operation processing core 111d may stop operating. Thus, data of tasks stored in the run queue corresponding to the fourth operation processing core 111d may migrate to the run queue corresponding to the third operation processing core 111c. For example, data of the third, fourth, sixth, and seventh tasks T3, T4, T6, and T7 respectively may migrate from the run queue corresponding to the fourth operation processing core 111d to the run queue corresponding to the third operation processing core 111c.

The task migration operation may be processed by an operation processing core that starts operating, an operation processing core that is operating, or both. For example, at least one of the second and third operation processing cores 111b and 111c may process the task migration operation for the third operation processing core 111c.

Additionally, an eighth task T8 may be generated in response to a request from the application section 210. When the eighth task T8 is provided from the task scheduler 231, the eighth task T8 may be allocated to the second operation processing core 111b. In this case, data of the eighth task T8 may be stored in the run queue corresponding to the second operation processing core 111b. While the task migration operation is performed for the third operation processing core 111c, the second operation processing core 111b may process the additional task T8 to reduce a load on the third operation processing core 111c.

Figure 16:
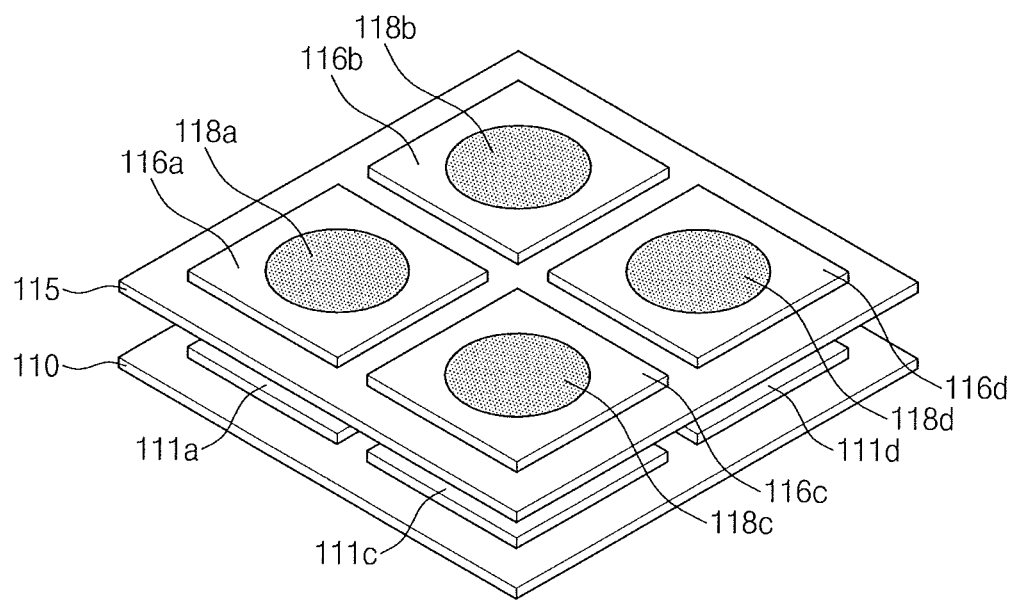
FIG. 16 is a perspective view of an embodiment of the operation processor of FIG. 1.

FIG. 16 is a perspective view of an embodiment of the operation processor 110 of FIG. 1. For example, the operation processor 110 of FIG. 1 may be configured as illustrated in FIG. 16. The example embodiment of FIG. 16 is provided to facilitate understanding, and is not intended to limit the present disclosure. In some example embodiments, the operation processor 110 may include operation processing cores that are stacked. For example, the operation processor 110 may include a plurality of operation processing cores 111 that is disposed at a first layer, and the operation processor 110 may further include a plurality of operation processing cores 116a, 116b, 116c, and 116d (generally 116) that is disposed at a second layer. For example, a stacked substrate 115 may be provided between the first layer and the second layer. The operation processing cores 111 and 116 may be implemented in a single semiconductor package.

Each of the operation processing cores 111 and 116 may include a special-purpose processor circuit to perform any operation. The operation processing cores 111 and 116 may be connected to each other through conducting lines, and may exchange operation results with each other through the conducting lines. In some example embodiments, the operation processor 110 may include temperature sensors 118a, 118b, 118c, and 118d (generally 118) and 113. The temperature sensors 113a, 113b, 113c, 113d, 118a, 118b, 118c, and 118d may sense temperatures of the operation processing cores 111a, 111b, 111c, 111d, 116a, 116b, 116c, and 116d, respectively.

Each of the operation processing cores 111 and 116 may sense any combination of its own temperature and a temperature of other operation processing core, based on sensing results of the temperature sensors 113 and 118. For example, the operation processing cores 111 and 116 may exchange data of the sensed temperature of any operation processing core with each other through the conducting lines. It has been described with reference to FIG. 2 that the number and disposition of the operation processing cores 111 and 116, and the number and disposition of the temperature sensors 113 and 118 might be variously changed or modified.

Each of the operation processing cores 111 and 116 may either operate or not operate depending on a temperature, a spatial position, or both. Operations of the operation processing cores 111 and 116 may be controlled with consideration for operation performance, power consumption, and the life of the electronic device 100 and the operation processor 110.

The operation processing cores 111 and 116 may be managed based on the example embodiments described with reference to FIG. 1 to FIG. 15. For brevity, redundant descriptions associated with the example embodiments will be omitted hereinafter.

As the operation processing cores 111 and 116 operate in parallel, the performance of the operation processor 110 may be improved, comparing to the performance of an operation processor including a single core. In addition, the operation processing cores 111 and 116 may be stacked to reduce an area occupied by the operation processor 110.

Figure 17:
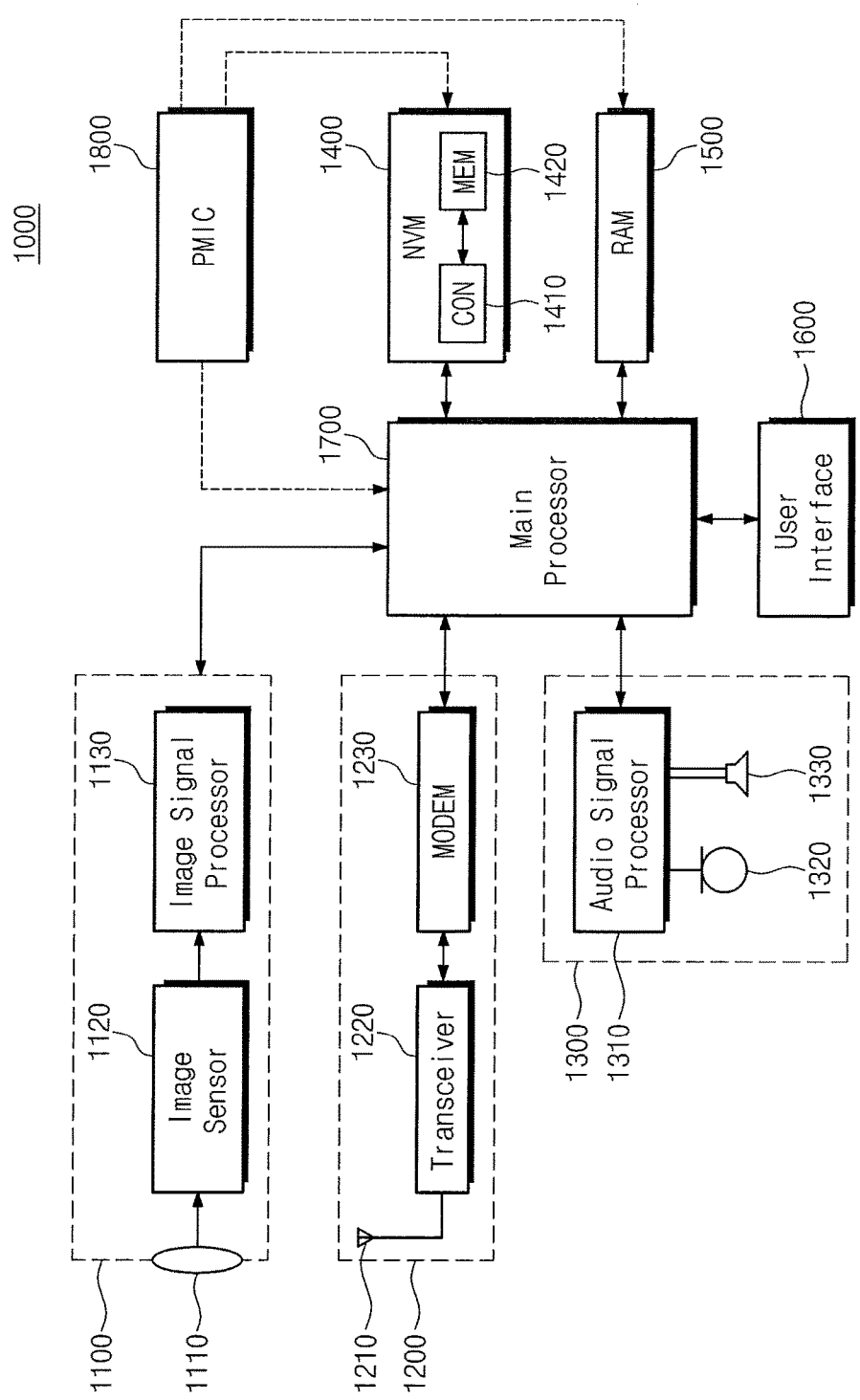
FIG. 17 is a block diagram illustrating a mobile electronic device that may include an operation processor according to various embodiments of the present disclosure.

FIG. 17 is a block diagram illustrating a mobile electronic device 1000 that may include an operation processor according to various embodiments of the present disclosure. The mobile electronic device 1000 may include an image processor 1100, a wireless communication block 1200, an audio processor 1300, a nonvolatile memory 1400, a RAM 1500, a user interface 1600, a main processor 1700, and a power management integrated circuit 1800. In some example embodiments, the mobile electronic device 1000 may be one of various electronic devices, such as a mobile terminal device, a portable digital assistant (PDA), a personal multimedia player (PMP), a digital camera, a smart phone, a notebook computer, a table computer, or a wearable device.

The image processor 1100 may receive light through a lens 1110. An image sensor 1120 and an image signal processor 1130 included in the image processor 1100 may generate an image based on the received light. The wireless communication block 1200 may include an antenna 1210, a transceiver 1220, and a modulator/demodulator (MODEM) 1230. The wireless communication block 1200 may communicate with an external entity of the mobile electronic device 3000 in compliance with various wireless communication protocols, such as global system for mobile communication (GSM), code division multiple access (CDMA), wideband CDMA (WCDMA), high speed packet access (HSPA), evolution-data optimized (EV-DO), worldwide interoperability for microwave access (WiMax), wireless broadband (WiBro), long term evolution (LTE), Bluetooth, near field communication (NFC), wireless fidelity (WiFi), or radio frequency identification (RFID). The audio processor 1300 may process an audio signal by means of the audio signal processor 1310. The audio processor 1300 may receive an audio input through a microphone 1320 and/or may provide an audio output through a speaker 1330.

The nonvolatile memory 1400 may store data that is required to be retained irrespective of whether power is supplied. For example, the nonvolatile memory 1400 may include at least one of a flash memory, a PRAM, an MRAM, a ReRAM, an FRAM, or any combination thereof. A memory device 1420 may store or output data according to the control of a memory controller 1410. The RAM 1500 may store data used to operate the mobile electronic device 1000. For example, the RAM 1500 may be used as a working memory, an operation memory, or a buffer memory of the mobile electronic device 1000. The RAM 1500 may temporarily store data processed, or to be processed, by the main processor 1700.

For example, the nonvolatile memory 1400 may include the nonvolatile memory 150 of FIG. 1, and the RAM 1500 may include the buffer memory 130 of FIG. 1. For example, the nonvolatile memory 1400 may include a one or more of a data of software/firmware and a core data. For example, the RAM 1500 may store data of a run queue.

The user interface 1600 may process interfacing between a user and the mobile electronic device 1000 according to the control of the main processor 1700. For example, the user interface 1600 may include one or more of an input interface, such as a keyboard, a keypad, a button, a touch panel, a touch screen, a touch ball, a touch pad, a camera, a microphone, a gyroscope sensor, and a vibration sensor. The user interface device 1600 may include one or more of an output interface, such as a display device, and a motor. For example, the display device may include one or more of a liquid crystal display (LCD), a light emitting diode (LED) display, an organic LED (OLED) display, and an active matrix OLED (AMOLED) display.

The main processor 1700 may control the overall operations of the mobile electronic device 1000. The image processor 1100, the wireless communication block 1200, the audio processor 1300, the nonvolatile memory 1400, and the RAM 1500 may execute a user command provided via the user interface 1600 according to the control of the main processor 1700. In addition, the image processor 1100, the wireless communication block 1200, the audio processor 1300, the nonvolatile memory 1400, and the RAM 1500 may provide a service to the user via the user interface 1600 according to the control of the main processor 1700. The main processor 1700 may include the operation processor 110 of FIG. 1. The main processor 1700 may include a plurality of operation processing cores. These operation processing cores may be implemented and may operate based on the example embodiments described with reference to FIG. 1 to FIG. 16.

For example, each of the operation processing cores may operate or may not operate according to a temperature, a spatial position of the respective operation processing core or both. Thus, the main processor 1700 and the mobile electronic device 1000 may consume the small amount of power at low temperature while operating with maximum performance. Moreover, the life of the main processor 1700 may not decrease rapidly. For brevity, redundant descriptions associated with the example embodiments will be omitted hereinafter.

The power management integrated circuit 1800 may manage power used to operate the mobile electronic device 1000. For example, the power management integrated circuit 1800 may convert power supplied from a battery (not shown) or an external power source (not shown) into any suitable form or level. In addition, the power management integrated circuit 1800 may supply the converted power to components of the mobile electronic device 1000.

For example, the power management integrated circuit 1800 may include the power manager 170 of FIG. 1. For example, the power management integrated circuit 1800 may supply power to an operation processing core that is operating, and the power management integrated circuit 1800 may not supply power to an operation processing core that does not operate. For example, the power management integrated circuit 1800 may supply an operation voltage to the nonvolatile memory 1400, the RAM 1500 or both.

According to the example embodiments, an operation processor including a plurality of operation processing cores and an electronic device including the operation processor may operate efficiently and effectively. An operation processor and an electronic device according to the example embodiments may consume the small amount of power at low temperature while operating with maximum performance. In addition, the life of the operation processor may not decrease rapidly.

One or more of a circuit, a chip, and a device according to the example embodiments may be mounted in various types of semiconductor packages. For example, one ore more of a circuit, a chip, and a device according to the example embodiments may be packaged by one or more of package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), metric quad flat pack (MQFP), thin quad flat pack (TQFP), small outline integrated circuit (SOIC), shrink small outline package (SSOP), thin small outline package (TSOP), system in package (SIP), multi-chip package (MCP), wafer-level fabricated package (WFP), and wafer-level processed stack package (WSP).

The configuration of various embodiments shown in each of diagrams is to be understood for its teachings and not to be construed as limitations. To facilitate understanding of the present disclosure, forms, structures, and sizes of each component shown in each diagram have been exaggerated or reduced. A configuration actually implemented may have a different physical shape from that shown in each diagram. Each diagram is not intended to limit the physical shape of the components.

A device configuration shown in each block diagram is provided to help better understanding of the present disclosure. Each block may be formed of smaller blocks according to functions. Alternatively, a plurality of blocks may form a larger block according to a function. That is, the spirit or the scope of the present disclosure is not limited to the configuration shown in a block diagram.

Above, the present disclosure has been described based on some example embodiments. However, the purpose of the present disclosure may be achieved with a different manner from the above example embodiments including the subject matters of the present disclosure according to the nature of the art. Therefore, it should be understood that the above example embodiments are in descriptive and illustrative views, rather than restrictive views. That is, the spirits or the scope that includes the subject matters of the present disclosure and that may achieve a goal of the present disclosure should be included within the spirits or the scope of the inventive concepts of the present disclosure.

Accordingly, a modified or altered technical concept without departing from the scope or the spirit of the present disclosure is included in the scope of the claims below. The scope of the present disclosure is not limited to the above example embodiments.

What is claimed is:

1. An operation processor comprising:
a plurality of operation processing cores disposed at spatially different positions; and
at least one temperature sensor configured to sense temperatures of the plurality of operation processing cores,
wherein when a temperature of a first operation processing core that is operating is sensed to be equal to or greater than a reference value, a second operation processing core that does not operate starts to operate and the first operation processing core stops operating, wherein the second operation processing core is selected as an operation processing core spatially spaced apart farthest from a third operation processing core that is operating, from among operation processing cores that do not operate in the plurality of operation processing cores, and wherein while the second operation processing core, the third operation processing core, and a fourth operation processing core are operating, when a target operation processing core among the second, third, and fourth operation processing cores is requested to stop operating, the target operation processing core is selected such that spatial distances between operation processing cores that are to continuously operate among the second, third, and fourth operation processing cores become greatest.

2. The operation processor as set forth in claim 1, wherein the second operation processing core is further selected as an operation processing core sensed to have a lowest temperature, from among operation processing cores that do not operate in the plurality of operation processing cores.

3. The operation processor as set forth in claim 1, wherein after the second operation processing core starts operating, a task of a first run queue corresponding to the first operation processing core migrates to a second run queue corresponding to the second operation processing core.

4. The operation processor as set forth in claim 1, wherein when a temperature of the second operation processing core is sensed to be equal to or higher than a threshold value after the second operation processing core starts operating, an operation frequency of the second operation processing core decreases.

5. The operation processor as set forth in claim 1, wherein when a temperature of the second operation processing core is sensed to be equal to or higher than a threshold value after the second operation processing core starts operating, at least one of the first operation processing core and a fifth operation processing core that does not operate starts to operate and the second operation processing core stops operating.

6. The operation processor as set forth in claim 1, wherein when the temperature sensor senses that an operation temperature obtained according to the temperatures of the plurality of operation processing cores is equal to or higher than a threshold value, all the plurality of operation processing cores stop operating.

7. An electronic device comprising:
an operation processor comprising a plurality of operation processing cores disposed at spatially different positions; and
a power manager configured to supply power to the plurality of operation processing cores of the operation processor,
wherein when a temperature of a first operation processing core increases to a value that is equal to or greater than a reference value while power is supplied to the first operation processing core and a second operation processing core, power supply to a third operation processing core that is not supplied with power is started and power supply to the first operation processing core is stopped,
wherein the third operation processing core is selected as an operation processing core spatially spaced apart farthest from the second operation processing core, from among operation processing cores that are not supplied with power in the operation processor, wherein the second operation processing core is configured to determine a spatial distance to each of the plurality of operation processing cores and to select the third operation processing core, and wherein while the second operation processing core, the third operation processing core, and a fourth operation processing core are supplied with power, when power supply to a target operation processing core among the second, third, and fourth operation processing cores is requested to be stopped, the target operation processing core is selected such that spatial distances between operation processing cores that are continuously supplied with power among the second, third, and fourth operation processing cores become greatest.

8. The electronic device as set forth in claim 7, wherein the third operation processing core is further selected as an operation processing core having a lowest temperature, from among operation processing cores that are not supplied with power in the operation processor.

9. The electronic device as set forth in claim 7, further comprising:
a nonvolatile memory configured to store data associated with a position of each of the plurality of operation processing cores that are disposed at spatially different positions.

10. The electronic device as set forth in claim 9,
wherein the second operation processing core is configured to determine the spatial distance to each of the plurality of operation processing cores and to select the third operation processing core, with reference to the data stored in the nonvolatile memory.

11. The electronic device as set forth in claim 7, further comprising:
a buffer memory configured to exchange data with the operation processor,
wherein the buffer memory is further configured to store data of a run queue corresponding to each of the plurality of operation processing cores, and
wherein a task of a first run queue corresponding to the first operation processing core migrates to a second run queue corresponding to the third operation processing core.

12. The electronic device as set forth in claim 7,
wherein power supply to a fifth operation processing core that is not supplied with power is started in response to a request of increasing a resource of the operation processor, and
wherein the fifth operation processing core is selected as an operation processing core based on at least one of the fifth operation processing core having a lowest temperature and the fifth operation processing core being spatially spaced apart farthest from the second, third, and fourth operation processing cores, from among operation processing cores that are not supplied with power in the operation processor.

13. The electronic device as set forth in claim 12, wherein after the power supply to the fifth operation processing cores is started, tasks processed by the second, third, fourth, and fifth operation processing cores are distributed to at least one of the second, third, fourth, and fifth operation processing cores such that loads on the second, third, fourth, and fifth operation processing cores maintain in balance.

14. The electronic device as set forth in claim 7, wherein power supply to the target operation processing core selected from the second, third, and fourth operation processing cores is stopped in response to a request of decreasing a resource of the operation processor.

15. An operation processor comprising:
- a plurality of processor cores, each processor core being spatially dispersed from another processor core, at least one of the processor cores configured to execute at least one task;
- a plurality of thermal sensors, each thermal sensor proximally located to a respective processor core and configured to sense a temperature of the respective processor core; and
- a system control device in communication with each of the thermal sensors and configured to:
- migrate at least one task from a first processor core to a second processor core in response to a temperature of the first processor core exceeding a first threshold,
- after migrating the at least one task from the first processor core to the second processor core, reduce an operating frequency of the first processor core in response to the temperature of the first processor core exceeding a second threshold,
- deactivate the first processor core and activate the second processor core in response to the temperature of the first processor core exceeding a third threshold, and
- deactivate the operation processor in response to the temperature of the first processor core exceeding a fourth threshold.

16. The operation processor of claim 15 further comprising a power management device configured to deactivate at least one of the processor cores in response to a request from the system control device.

17. The operation processor of claim 15 wherein the system control device samples each of the thermal sensors on a periodic basis.

18. The operation processor of claim 15 wherein the system control device is further configured to change a number of processor cores that are activated in proportion to a resource level request from a user of the operation processor.

19. The operation processor of claim 15 wherein the system control device is further configured to migrate at least one task from the first processor core to the second processor core to match a first computation load of the first processor core to a second computational load of the second processor core.

* * * * *